(12) United States Patent
Olkowski et al.

(10) Patent No.: US 9,388,251 B2
(45) Date of Patent: Jul. 12, 2016

(54) CATALYTIC BIOMASS CONVERSION

(75) Inventors: Andrew A. Olkowski, Saskatoon (CA);
Bernard Laarveld, Saskatoon (CA);
Norman Arrison, Edmonton (CA)

(73) Assignee: Nano-Green Biorefineries Inc.,
Saskatoon, Saskatchewan (CA)

( * ) Notice: Subject to any disclaimer, the term of this patent is extended or adjusted under 35 U.S.C. 154(b) by 38 days.

(21) Appl. No.: 14/127,196

(22) PCT Filed: Jun. 29, 2012

(86) PCT No.: PCT/CA2012/000634
§ 371 (c)(1),
(2), (4) Date: Mar. 24, 2014

(87) PCT Pub. No.: WO2013/000074
PCT Pub. Date: Jan. 3, 2013

(65) Prior Publication Data
US 2014/0200335 A1    Jul. 17, 2014

Related U.S. Application Data

(60) Provisional application No. 61/503,058, filed on Jun. 30, 2011.

(51) Int. Cl.
| | |
|---|---|
| *C08B 15/08* | (2006.01) |
| *D21C 3/04* | (2006.01) |
| *D21C 3/22* | (2006.01) |
| *D21C 9/16* | (2006.01) |
| *D21C 11/00* | (2006.01) |
| *B01J 23/889* | (2006.01) |
| *C08H 8/00* | (2010.01) |
| *C08B 1/00* | (2006.01) |
| *C08B 15/02* | (2006.01) |

(52) U.S. Cl.
CPC ............. *C08B 15/08* (2013.01); *B01J 23/8892* (2013.01); *C08B 1/00* (2013.01); *C08B 15/02* (2013.01); *C08H 8/00* (2013.01); *D21C 3/04* (2013.01); *D21C 3/222* (2013.01); *D21C 9/163* (2013.01); *D21C 11/0007* (2013.01)

(58) Field of Classification Search
CPC ........... D21C 3/04; D21C 3/222; C08B 15/08
See application file for complete search history.

(56) References Cited

U.S. PATENT DOCUMENTS

| | | | |
|---|---|---|---|
| 2,078,446 A | 4/1937 | Grigg | |
| 2,978,446 A | 4/1961 | Battista et al. | |
| 3,146,168 A | 8/1964 | Battista et al. | |
| 4,266,981 A * | 5/1981 | Tsao et al. | 127/37 |
| 4,314,854 A | 2/1982 | Takagi | |
| 4,347,103 A * | 8/1982 | Rende | 162/79 |
| 5,194,416 A * | 3/1993 | Jureller et al. | 502/167 |
| 5,580,974 A | 12/1996 | Banker et al. | |
| 6,037,380 A | 3/2000 | Venables et al. | |
| 6,042,769 A * | 3/2000 | Gannon et al. | 264/203 |
| 6,046,375 A * | 4/2000 | Goodell et al. | 588/315 |
| 6,120,556 A * | 9/2000 | Nishino et al. | 8/111 |
| 6,258,208 B1 * | 7/2001 | Lindeberg et al. | 162/65 |
| 6,554,958 B1 * | 4/2003 | Devic | 162/72 |
| 7,669,292 B2 | 3/2010 | Chute et al. | |
| 7,700,764 B2 * | 4/2010 | Heijnesson-Hulten | 536/56 |
| 8,778,136 B2 * | 7/2014 | Nonni et al. | 162/78 |
| 2003/0083491 A1 * | 5/2003 | Komen et al. | 536/56 |
| 2005/0187126 A1 * | 8/2005 | Busch et al. | 510/311 |
| 2006/0124124 A1 | 6/2006 | Soni et al. | |
| 2006/0260773 A1 | 11/2006 | Tan et al. | |
| 2006/0289132 A1 | 12/2006 | Heijnesson-Hulten | |
| 2009/0205143 A1 * | 8/2009 | Hage et al. | 8/111 |
| 2010/0151159 A1 | 6/2010 | Beck et al. | |
| 2010/0159569 A1 * | 6/2010 | Medoff et al. | 435/277 |
| 2010/0233481 A1 | 9/2010 | Isogai et al. | |
| 2010/0288456 A1 * | 11/2010 | Westland et al. | 162/57 |
| 2010/0311139 A1 * | 12/2010 | Baures et al. | 435/161 |
| 2012/0040411 A1 * | 2/2012 | Henriksson et al. | 435/99 |
| 2012/0043038 A1 * | 2/2012 | Dodd | 162/141 |

(Continued)

FOREIGN PATENT DOCUMENTS

| | | |
|---|---|---|
| GB | 555985 | 9/1943 |
| RU | 2425715 | 8/2011 |
| WO | 9400234 | 1/1994 |

(Continued)

OTHER PUBLICATIONS

Abbaslou, R. M. M., Tavasoli, A. and Dalai, A.K. 2008. Effect of pre-treatment on physico-chemical properties and stability of carbon nanotubes supported iron Fischer—Tropsch catalysts. Applied Catalysis A: General 355 (2009) 33-41.
Bai, W., Holbery, J. and Li, K. 2009. A technique for production of nanocrystalline cellulose with a narrow size distribution. Cellulose 16, 455-465.
Barbusinski, K. 2009. Fenton reaction—controversy concerning the chemistry. Ecological Chemistry and Engineering 16, 247-258.
Cherubini, F. and Strømman, A.H. 2011. Chemicals from lignocellulosic biomass: opportunities, perspectives, and potential of biorefinery systems. Biofuels, Bioprod. Bioref. 5: 548-561.
Duran, N. et al. 2011. A Minireview of cellulose nanocrystals and its potential integration as co-product in bioethanol production. J Chil Chem Soc., 56, No. 2.
Filson, P.B. and Dawson-Andoh, B.E. 2009. Sono-chemical preparation of cellulose nanocrystals from lignocellulose derived materials. Bioresource Technology 100: 2259-2264.

(Continued)

*Primary Examiner* — Liam J Heincer
(74) *Attorney, Agent, or Firm* — Bennett Jones LLP

(57) ABSTRACT

A biorefining method of processing a lignocellulosic biomass to separate lignin and hemicellulose from cellulose includes the steps of (a) reacting the biomass in an aqueous slurry having a pH less than 7, comprising a transition metal catalyst, hydrogen peroxide; and (b) separating a solid cellulose fraction from dissolved lignin and hemicellulose fractions. The method may also be used to treat cellulose and produce microcrystalline or nanocrystalline cellulose. The transition metal catalyst may be a nanoparticulate catalyst including multivalent iron, iron oxides and iron hydroxides. The nanoparticulate catalyst may be formed by oxidizing a highly reduced solution of iron, such as groundwater that has not been exposed to oxygen.

24 Claims, 21 Drawing Sheets

(56) References Cited

U.S. PATENT DOCUMENTS

| | | | |
|---|---|---|---|
| 2012/0175073 A1* | 7/2012 | Nonni et al. ............... | 162/67 |
| 2013/0248128 A1* | 9/2013 | Rector et al. ............... | 162/76 |

FOREIGN PATENT DOCUMENTS

| | | |
|---|---|---|
| WO | WO 0159204 A1 * | 8/2001 |
| WO | 2006119392 | 11/2006 |
| WO | 2007001229 | 1/2007 |
| WO | 99109244 | 2/2009 |
| WO | 2010138941 | 12/2010 |
| WO | 2011050359 | 4/2011 |
| WO | 2011072365 | 6/2011 |
| WO | 2013162421 | 10/2013 |
| WO | 2013162422 | 10/2013 |

OTHER PUBLICATIONS

Hirota, M., Tamura, N., Saito, T. and Isogai, A. 2010. Water disper
Harmsen, P., Huijgen, W., Bermudez, L. and Bakker, R. 2010. Literature Review of Physical and Chemical Pretreatment Processes for Lignocellulosic Biomass. Report 1184, Wageningen UR Food & Biobased Research, Wageningen, The Netherlands. ISBN 978-90-8585-757-0. sion of cellulose II nanocrystals prepared by TEMPO-mediated oxidation of mercerized cellulose at pH 4.8. Cellulose 17:279-288.
Isogai, A., Saito, A. and Fukuzumi, H. 2011. TEMPO-oxidized cellulose nanofibers. Nanoscale 3, 71-85.
King, D. 2010. The Future of Industrial Biorefineries. King, D. Ed. World Economic Forum. REF: 210610; www3.weforum.org/docs/WEF_FutureIndustrialBiorefineries_Report_2010.
Klemm, D., Kramer, F., Moritz, S., Lindstrom, S., Ankerfors, M., Gray, D. and Dorris, A. 2011. Nanocelluloses: A New Family of Nature-Based Materials. Angew. Chem. Int. Ed. 50, 5438-5466.
Leung, A.C. W., Hrapovic, S., Lam, E., Lui, Y., Male, K.B., Mahmoud, K.A. and Luong, J.H.T. 2011. Characteristics and Properties of Carboxylated Cellulose Nanocrystals Prepared from a Novel One-Step Procedure. Small 7, 3, 302-305.
Minotti, G. and Aust, S.D. 1989. The role of iron in oxygen radical mediated lipid peroxidation. Chemico-Biological Interactions 71 (1): 1-19.
Mishra, S.P., Manent, A.S. , Chabot, B. and Daneault, C. 2012. Production of nanocellulose from native cellulose—various options utilizing ultrasound. BioResources 7: 422-436.
Neyens, E., Baeyens, J. 2003. A review of classic Fenton's peroxidation as an advanced oxidation technique. Journal of Hazardous Materials B98, 33-50.
Pierre, J.L., Fontecave, M. 1999. Iron and activated oxygen species in biology: The basic chemistry. BioMetals 12: 195-199.
Pierre, J.L., Gautier-Luneau, I. 2000. Iron and citric acid: A fuzzy chemistry of ubiquitous biological relevance: BioMetals 13: 91-96.
Saito, T., Kimura, T., Nishiyama, Y. and Isogai, A. 2007. Cellulose Nanofibers Prepared by TEMPO-Mediated Oxidation of Native Cellulose. Biomacromolecules 8, 2485-2491.
Sixta, H. 2006. Handbook of Pulp. H. Sixta Ed. WILEY-VCH Verlag GmbH &Co. KGaA, Weinheim, Germany.
Sixta, H., Süss, H-U., Potthast, A., Schwanninger, M. and Krotscheck, A.W. 2006. Pulp Bleaching in Handbook of Pulp. H. Sixta Ed. WILEY-VCH Verlag GmbH &Co. KGaA, Weinheim, Germany. vol. 2, Chapter 7, p. 609.
Surisetty, V.R., Dalai, A. K. and Kozinski, J. 2010. Intrinsic reaction kinetics of higher alcohol synthesis from synthesis gas over a sulfided alkali-promoted Co—Rh—Mo trimetallic catalyst supported on Multiwalled Carbon Nanotubes (MWCNTs). Energy & Fuels 24 (8), 4130-4137.
Swern, D. 1971. Organic Peroxides in Organic Peroxides, D. Swern, Eds., Wiley-Interscience, New York, vol. 2, 963 pp.
Wink, D.A., Wink, C.B., Nims, R.W., Ford, P.C. 1994. Oxidizing Intermediates Generated in the Fenton Reagent: Kinetic Arguments Against the Intermediacy of the Hydroxyl Radical. Environ Health Perspect 102 (Suppl 3): 11-15 (1994).

* cited by examiner

CATALYTIC BIOMASS CONVERSION

FIELD OF THE INVENTION

The present invention relates to a nanocatalyst, methods of producing a nanocatalyst, and a catalytic biorefining process using a transition metal-based catalytic reaction for converting biomass.

BACKGROUND

Biorefineries convert biomass or biological materials into fuels, energy, chemicals and/or bioproducts (King, 20120). Many biorefining technologies exist or are under development. Most prevalent at present are biorefineries for the production of fuels, such as biodiesel from vegetable oils, and alcohol from grain, sugar cane or from lignocellulosic sources. Chemicals generated by biorefineries may provide the building blocks for the chemical industry, referred to as green platform chemicals, which replace fossil fuel generated platform chemicals (Cherubini and Strømman, 2011). Biorefineries generate these green platform chemicals purposely or as a by-product stream and in either case, these may be valuable products.

Natural biopolymers and renewable sources of fuels and chemicals are increasingly important environmentally and economically (King, 2010). Renewable resources are a means of reducing our dependence on conventional fossil fuels for fuel and chemicals. Renewable resources can provide for basic chemical constituents that are needed for many industries, such as monomers for plastics. Biomass can provide fuel and chemicals along with many specialized products such as cellulose for foods and paper, which cannot be obtained in any other manner.

Biomass typically refers to and any material of biological origin, living or dead, and includes, but is not limited to, plant parts, fruits, vegetables, plant processing waste, chaff, grain, meals, straw, hemp, grasses, oat hulls, rice hulls, corn, corn husks, cotton gin waste, weeds, aquatic plants, hay, forestry products, wood chips, wood waste, wood pulp, pulping byproducts, paper, paper products, paper waste, or peat. Hydrocarbons such as coal, lignite coal, oil, heavy oil or tar may also be considered biomass materials in some instances.

The primary constituents of lignocellulosic biomass are lignin, hemicellulose and cellulose, of which lignin comprises about 6% to 40% by weight. Lignin carries proportionately more of the recoverable energy in biomass. However, recalcitrance of lignin is a serious impediment in the biorefining of lignocellulosic biomass. Lignin is heterogeneous and lacks a primary defining structure, comprising chains of aromatic and oxygenate constituents forming larger molecules that are not easily treated by most currently available processes.

Lignocellulosic biomass is typically comprised of about 38% to 70% of cellulose by weight depending on source, with hardwoods and hemp straw containing higher levels of cellulose. Hemicellulose content in biomass is variable ranging from about 10% to 30%, with higher amounts found in agriculture-sourced biomass such as wheat straw and oat hulls.

It is well-known in the art (Sixta, 2006) to process biomass such as wood and other lignocellulosic material to obtain cellulose through well known processes such as Kraft pulping and bleaching processes such as elemental chlorine free (ECF) and total chlorine free (TCF) bleaching. Wood chips are digested in a Kraft digester to produce brown pulp which has a kappa number (K) of about 25, which is an indication of the residual lignin content or bleachability of the pulp. The brown pulp is screened and then passed through an oxygen delignification process, followed by usually several steps of hydrogen peroxide bleaching at alkaline pH and filtering and drying, to reduce the K to less than about 5, and produce Kraft bleached pulp.

It is well known to those in the art (Sixta et al., 2006) that it is critically important to avoid presence of transition metals during the hydrogen peroxide bleaching process. Reactive oxygen species, particularly hydroxyl radicals, generated through the Fenton reaction cause oxidative damage of the cellulose affecting pulp quality. For this reason, the pulping industry commonly employs chelating agents in the bleaching process to capture transition metals and prevent or minimize the Fenton reaction with hydrogen peroxide.

Microcrystalline cellulose (MCC) is a valuable biopolymer used in the food and pharmaceutical sectors and in industrial applications such as in oil, gas and mining. The predominant industrial process for generating MCC is well established (U.S. Pat. Nos. 2,078,446; 2,978,446 and 3,146,168). The process exposes highly pure cellulose such as dissolving grade alpha cellulose or Kraft pulp to a strong mineral acid digest, followed by a physical size reduction. Digestion with hydrochloric or sulfuric acid removes amorphous domains within cellulose fibrils, leaving fragments of cellulose fibrils with high crystallinity. However, the yield of industrial production is low (as low as 30%). Size range of MCC is variable and can be from 30 to about 100 microns and higher. The MCC then is processed and sorted to achieve specific ranges in size and form depending on the desired application. MCC can be further processed such as through blending with attriting aids (U.S. Pat. No. 6,037,380), grinding, homogenization, microfluidization or treatment with ultrasound to achieve smaller sizes, including less than about 1 micron, to generate solutions with colloidal properties. The predominant production process for MCC using acid hydrolysis is expensive due to high capital and operating costs, and the use of corrosive mineral acids is problematic with respect to safety and environment.

Microfibrillated cellulose (MFC), also known as cellulose nanofibrils and microfibrils, is a cellulose pulp where extensive defibrillation of the cellulose fibrils has occurred by mechanical delamination. The diameter of the fibrils is from about 5 to 60 nm, and the length can be several microns long. No acid digestion takes place and these fibrils do not have increased crystallinity compared to the parent material and are not considered to be crystalline cellulose. Mechanical delamination of the fibrillar structure in MFC production can be enhanced by increasing the friction of the fibrils through oxidation of cellulose fibers using a transition metal salt and hydrogen peroxide (U.S. Patent 2006/0289132 A1), persulfate salts (U.S. Pat. No. 5,580,974) or TEMPO (2,2,6,6-tetramethylpiperidine-1-oxyl radical) (US Patent 2010/0233481; Saito et al., 2007). The major drawback of the MFC production process is its very high energy requirement to achieve the required physical delamination (700-1400 MJ $kg^{-1}$ vs. <7 MJ $kg^{-1}$ for TEMPO and NCC; Isogai et al., 2011).

The most common process for generating nanocrystalline cellulose (NCC) is similar to that of MCC production, consisting of digestion with a strong mineral acid (such as 64% sulfuric acid), followed by mechanical size reduction (Klemm et al., 2011). Diverse parent materials can be used but wood pulp is predominant. Nanocrystalline cellulose fragments (also known as whiskers, nanowhiskers or nanocrystals) are generated with variable sizes reported in the literature (widths from 5 to 70 nm and lengths from 100 to several thousand nm). Physical properties of NCC are strongly influenced by source of parent material, the type of acid used in digest (hydrochloric or sulfuric), charge and dimensions. Several mechanical size reduction processes can be used following the acid digest such as ultrasonic treatment (Filson and Dawson-Andoh, 2009; Klemm et al., 2011), cryogenic crushing and grinding, and homogenization such as fluidization, which also increase yield. NCC may also be generated from MCC using strong mineral acid hydrolysis followed by separation by differential centrifugation, which results in a narrow size distribution of the NCC (Bai et al., 2009). The use of strong mineral acid hydrolysis for the production of NCC either from biomass sources or from MCC encounters the same economic, environmental and safety limitations as for the production of MCC.

TEMPO oxidation may be used to produce NCC with high carboxylate content and high dispersion in water (Isogai et al., 2011). Hirota et al. (2010) demonstrated high yield of NCC from mercerized wood cellulose oxidized using TEMPO at pH 4.8 for 1-5 days followed with ultrasound treatment. The TEMPO oxidation of MCC generated by acid hydrolysis from wood cellulose or mercerized cellulose resulted in lower yield of NCC with lower carboxylate content and comparatively lower dispersion in water.

Oxidation of biomass from renewable sources in a one-step procedure with ammonium persulfate has been reported to generate NCC with a high degree of carboxylation (WO 2011/072365 A1; Leung et al., 2011). The yields of NCC from hemp, flax, wood and MCC were 36%, 28%, 36% and 84%, respectively.

The value of refining lignocellulosic biomass into primary constituents and platform chemicals may be significantly enhanced with new, preferably environmentally friendly, processes that may increase yield, generate novel or improved end products, and/or are low cost, safe and non-polluting.

SUMMARY OF THE INVENTION

Aspects of the present invention may allow for relatively efficient biorefining of lignocellulosic biomas, resulting in the production of cellulose, lignin, hemicellulose, and their respective degradation products.

In one aspect, the present invention comprises a catalytic reaction process based on breakdown of complex structures into their constituents by reactive oxygen species (ROS) generated from hydrogen peroxide in the presence of a transition metal catalyst, at an acidic pH.

The refining process comprises fractionation and depolymerization, resulting in end products which may include lignin and lignin degradation products; hemicellulose and hemicellulose degradation products, and; cellulose which is produced in high yield and substantially free of lignin and hemicellulose. The catalytic process can be managed to achieve different degrees of depolymerization/degradation of the primary biomass constituents. Increased depolymerization/degradation is desirable for the purpose of producing platform chemicals to be used as inputs for the chemical industry. The lignin and cellulose fractions may be treated separately with additional catalytic reactions.

In one embodiment, to treat recalcitrant lignin or high lignin feedstock, a pre-treatment hydrolysis step is introduced using, for example, an organic acid, such as formic acid, and/or with a peracid oxidant such as performic acid. The peracid treatment may also be applied post-reaction.

In one embodiment, a second catalytic reaction of cellulose can be used to generate microcrystalline cellulose (MCC) and nanocrystalline cellulose (NCC, also referred to as cellulose nanocrystals (CNC)) in colloid, gel and dry film forms. The proportions of MCC and NCC and their size and colloidal properties may be controlled by the duration and strength of the catalytic reaction, and/or through post catalytic treatment as described herein.

In one embodiment, the lignin fraction may be depolymerized further by the catalytic reaction into intermediates such as vanillin and other degradation products including platform chemicals.

In one embodiment, where the biomass is pretreated by acid hydrolysis, hemicellulose is mostly extracted during the pretreatment step. Hemicellulose and its degradation products represents a group of compounds. Some may be reacted during the acid hydrolysis step and generate, for example, furfural. Other hemicellulose components will be harvested whole. Some residual hemicellulose may enter the catalytic reaction and will be converted into end products which have not been specifically characterized, but are probably alcohols and organic acids.

In another aspect, the invention comprises a transition metal-based catalyst comprising iron (Fe) in multivalent and in nanoparticle form, obtained from a novel process. In one embodiment, the catalyst may further comprise other transition metals such as copper.

Therefore, in one aspect, the invention may comprise a method of processing a lignocellulosic biomass to separate lignin and hemicellulose from cellulose:
  (a) reacting the biomass in an aqueous slurry having a pH less than 7 and comprising a transition metal catalyst and hydrogen peroxide;
  (b) separating a solid cellulose fraction from dissolved lignin and hemicellulose fractions.

In another aspect, the invention may comprise a method of producing a nanoparticulate catalyst from an aqueous solution comprising reduced iron, comprising the steps of:
  (a) oxidizing or allowing to oxidize the aqueous solution comprising reduced iron;
  (b) collecting precipitated nanoparticles or aggregated nanoparticles.

In yet another aspect, the invention may comprise a nanoparticulate catalyst comprising a multivalent iron, at least one iron oxide and at least one iron hydroxide.

In yet another aspect, the invention may comprise a method of producing crystalline cellulose from cellulose, comprising the steps of:
  (a) reacting the cellulose in an aqueous slurry having a pH less than 7, comprising a transition metal catalyst and hydrogen peroxide;
  (b) recovering a colloidal cellulose fraction comprising microcrystalline and nanocrystalline cellulose.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

DETAILED DESCRIPTION OF PREFERRED EMBODIMENTS

Figure 1:
FIG. 1 shows the oxidation of well-water following exposure to air. Change of color from clear and transparent (fresh water, left) to opaque and reddish-yellow (water exposed to air for 1 hour, right).

The present invention relates to methods of using a transition metal catalyst in a reaction process to refine biomass into bioproducts and chemicals, an iron-based nanoparticle catalyst, and methods of preparing the iron-based nanoparticle catalyst. Any term or expression not expressly defined herein shall have its commonly accepted definition understood by those skilled in the art.

As used herein, the term "nanoparticulate" or "nanoparticle" means a particle having at least one dimension less than about 500 nm, and preferably less than about 200 nm, and more preferably less than about 100 nm.

As used herein, the term "lignocellulosic biomass" means any material derived from living or once-living material comprising lignin and cellulose. Lignocellulosic biomass includes, but is not limited to, agricultural crops, residues and by-products from processing, such as wheat straw, flax straw, hemp straw, chaff, grasses, hay, grains and meals, oat hulls, rice hulls, corn stover, corn husks, sugarcane bagasse, weeds, aquatic plants, hay, cotton waste, animal or human waste; forestry products, residues and by-products from processing such as wood, wood pulp, Kraft pulp, dissolving grade pulp, thermomechanical or chemimechanical pulp, Kraft brown pulp, pulping waste and byproducts such as Kraft brown pulp shives, paper products and waste, damaged wood such as Mountain Pine Beetle damaged wood; and peat.

A hemicellulose is any of several heteropolymers (matrix polysaccharides) present along with cellulose in almost all plant cell walls. While cellulose is crystalline, strong, and resistant to hydrolysis, hemicellulose has a random, amorphous structure with little strength.

Lignin is a complex chemical compound which is an integral part of the secondary cell walls of plants. As a biopolymer, lignin is unusual because of its heterogeneity and lack of a defined primary structure. It is covalently linked to hemicellulose and, therefore, crosslinks different plant polysaccharides, conferring mechanical strength to the cell wall and by extension the plant as a whole.

In general terms, one aspect of the invention comprises a nanoparticulate transition metal catalyst. As used herein, "transition metal" means an element whose atom has an incomplete d sub-shell, or which can give rise to cations with an incomplete d sub-shell, including any element in the d-block of the periodic table, which includes groups 3 to 12 on the periodic table. In one embodiment, the catalyst comprises iron and a carrier, formed by oxidizing the iron in an aqueous solution with a precipitated ionic material which forms the carrier. The iron is initially in solution in a reduced state, with an oxidation number of from 0 to 5, or mixtures thereof. In one embodiment, the ionic material which forms the carrier comprises calcium carbonate in aqueous solution.

The aqueous solution of reduced iron and an ionic carrier material may be naturally sourced or created. Water containing iron from an underground source, groundwater, may provide a suitable solution. Because the iron in groundwater has not been exposed to atmospheric oxygen, it is often in a highly reduced state. An exemplary source of groundwater comprises the following elements as shown in Table 1:

TABLE 1

Mineral composition of groundwater.

|  | Units |
| --- | --- |
| Iron - extractable | 10.1 mg/L |
| Chloride | 7 mg/L |
| Nitrate | <1 mg/L |
| Calcium (Ca) | 357 mg/L |
| Potassium (K) | 12 mg/L |
| Magnesium (Mg) | 180 mg/L |
| Sodium (Na) | 79 mg/L |
| Sulfate ($SO_4$) | 1190 mg/L |
| SAR* | 0.9 SAR |
| pH | 7.2 |
| Conductance | 2500 uS/cm |
| Hardness ($CaCO_3$ equivalent) | 1630 mg/L |

*Sodium adsorption ratio is a measure of the relative concentration of sodium to calcium and magnesium. SAR can be calculated from the following equation:

$$SAR = \frac{Na^+}{\sqrt{\frac{Ca^{2+} + Mg^{2+}}{2}}}$$

where Na, Ca and Mg are expressed in milliequivalents per litre (meq/L).

When highly reduced groundwater is freshly pumped from the well, it is clear, but when exposed to air or oxidizing chemicals (e.g. hypochlorite-based water disinfection products), it becomes colored, as is shown in FIG. 1. Without restriction to a theory, it is believed that the coloration is due to the oxidation of iron. The clear highly reduced water comprises iron in a highly reduced state. This is consistent with the initial clear appearance of this water despite its high iron content. Following exposure to air or chlorine there is a notable change in transparency and color. A high content of oxidized iron adds a reddish-yellow tinge.

Figure 1A:
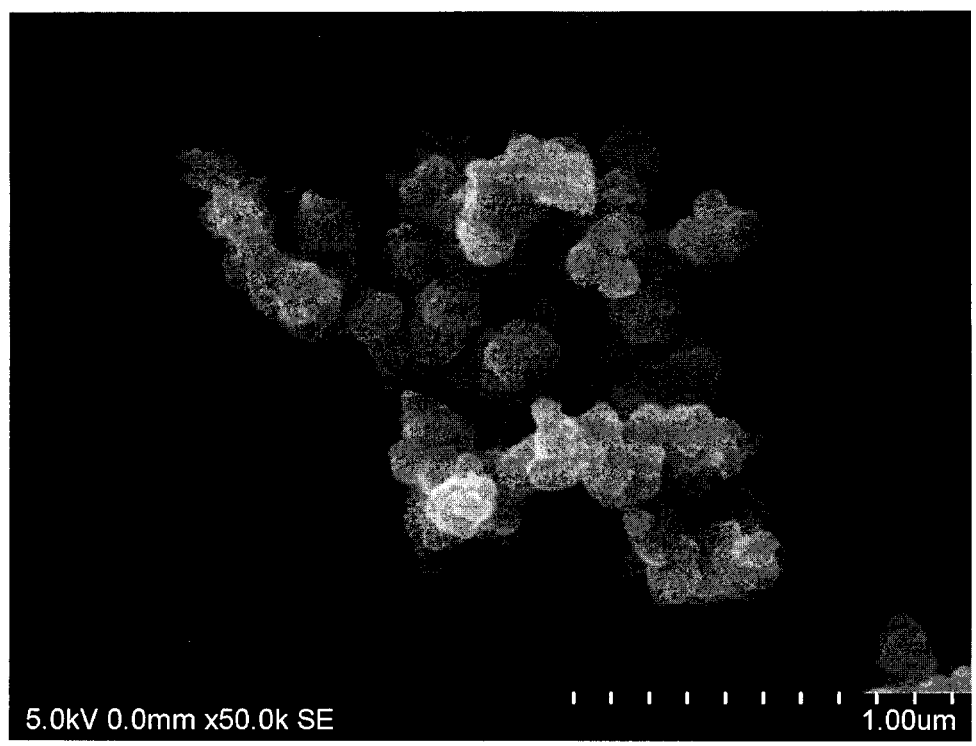
FIGS. 1A, 1B and 1C shows electromicrographs of one embodiment of the nanoparticulate catalyst formed.
Figure 1B:
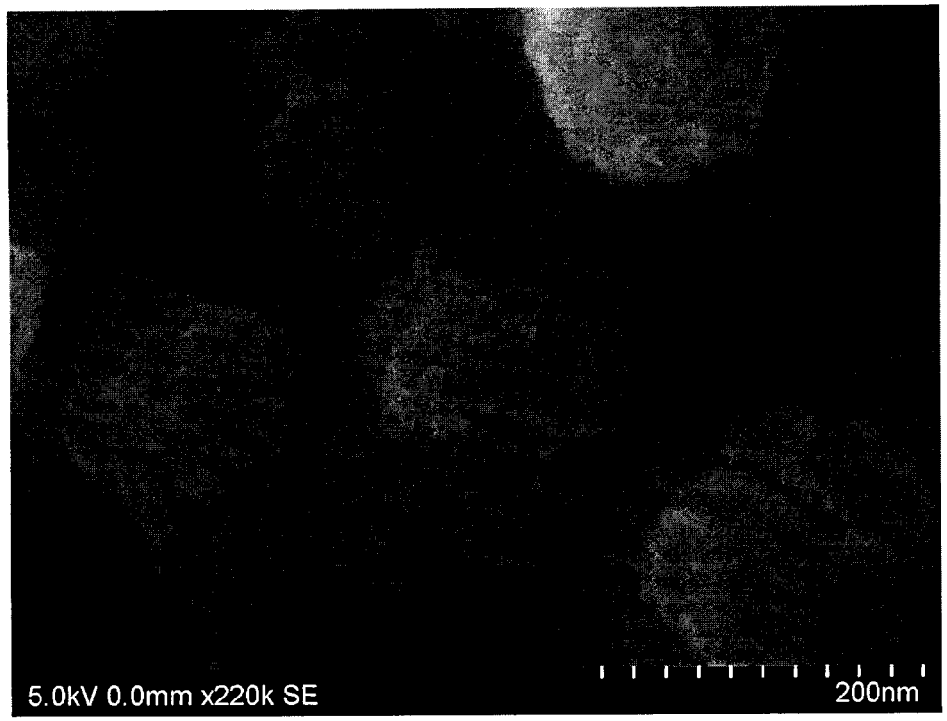
Figure 1C:
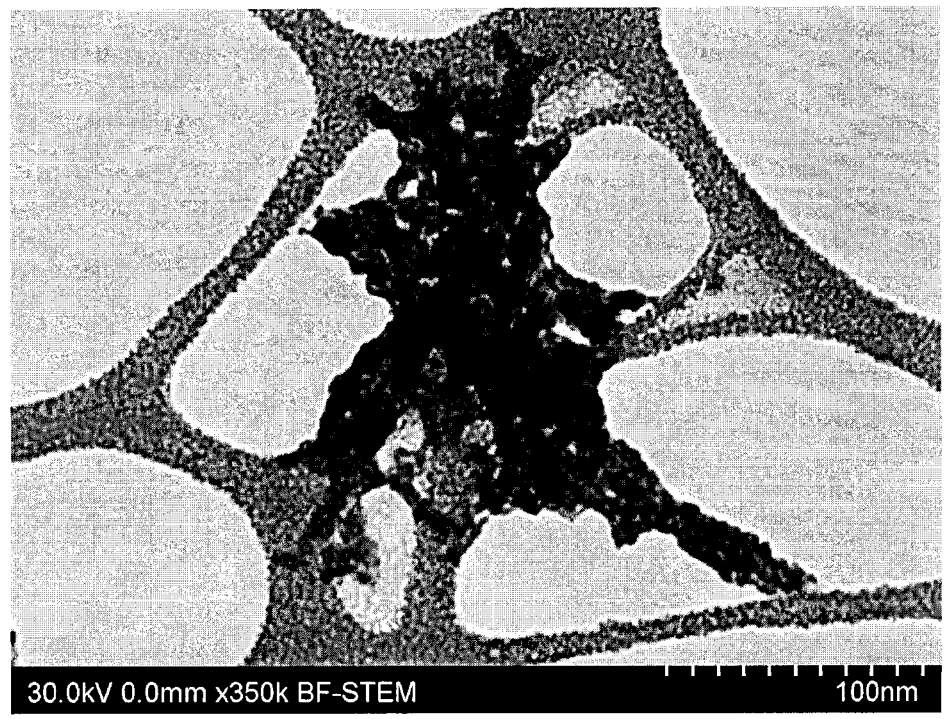

Upon oxidation, various elements in the water precipitate into nanoparticles, or aggregates of nanoparticles, with a large population of nanoparticles or aggregates in the 50 to 200 nm range. As shown in FIGS. 1A-1C, in one embodiment, the nanoparticles may have an approximate size of about 10 nm to about 100 nm, and may combine into larger agglomerations. Without restriction to a theory, it is believed that these nanoparticles may comprise one or more different structures. These structures may comprise calcium carbonate and iron (Table 2 below), where the calcium carbonate may create a nucleation structure and the iron is coated on the calcium carbonate nanoparticle, or is otherwise finely dispersed on or in the nanoparticle. In one embodiment, the iron is multivalent, and primarily mono- and di-valent. As used herein, "multivalent iron" means iron in more than one oxidation state, which may vary from zero to five.

In another embodiment, the nanoparticies may have a core structure comprising multivalent iron, at least one iron oxide, and at least one iron hydroxide. The core structure may include calcium carbonate. Such nanoparticles may play a complex role in redox reactions.

In another embodiment, the presence of various elements in the water may result in the formation of a heterogeneous catalyst with crystal imperfections that may enhance catalytic activity.

Whatever the structure, the nanoparticles may be easily harvested by decanting, filtration, centrifugation or other techniques well known to those skilled in the art.

Oxidation of the reduced water source may be accomplished by simply exposing the aqueous solution to air. In an alternative embodiment, oxidation and the precipitation of the nanoparticulate catalyst may be driven by the use of an oxidant, such as hypochlorite or hydrogen peroxide.

In one embodiment, the catalyst may comprise a secondary metal, which may comprise a transition metal, such as copper. The copper may be added to the aqueous solution prior to, or subsequent to, the oxidation step. For example, a solution of copper carbonate or copper sulfate may be mixed into the iron solution immediately after addition of the oxidant. In one embodiment, the molar ratio of copper to iron may be 1:20 to about 1:10.

In one aspect, the invention comprises a method of processing lignocellulosic biomass using a transition metal-based catalyst. The catalyst is combined with hydrogen peroxide, an organic acid, and the biomass feedstock, and promotes reactions where the biomass is fractionated and depolymerized. The products may comprise lignin and hemicellulose fractions and their respective depolymerization products, and a cellulose fraction. The cellulose fraction may comprise high-quality cellulose, and, in one embodiment, the conditions of the catalytic system may be varied to produce highly pure cellulose pulp, microcrystalline cellulose, and/or nanocrystalline cellulose.

In one embodiment, the catalyst comprises the nanocatalyst described above, however, other transition metal-based catalysts may be suitable. For example, the catalyst may comprise carbon nanotubes (multi-walled CNT or single walled CNT) impregnated with Fe, Cu, Mo, Rh or Co, or combinations thereof. The general method of synthesis of carbon nanotube catalysts has been described (Abbaslou et al. 2008; Surisetty et al. 2010). In another embodiment, the catalyst may comprise a transition metal salt, such as a cobalt salt, $CuSO_4$ or $FeSO_4$.

Figure 2:
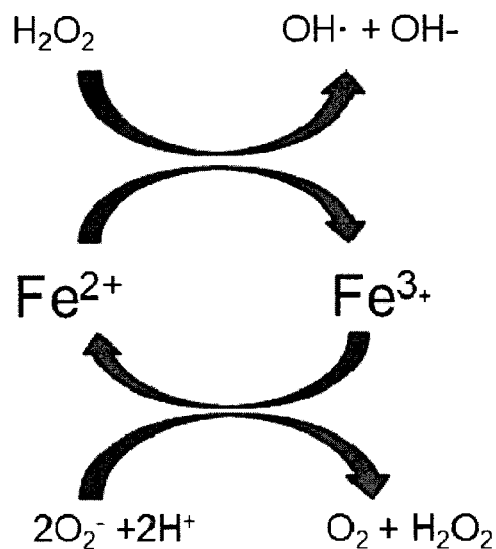
FIG. 2 shows a schematic of the chemistry of the catalytic system. The reaction involves redox cycling of iron, which is consistent with chemistry of the classic Fenton reaction and the Haber-Weiss reaction. The nature of the oxidizing species generated in Fenton reaction is not clearly understood and may be a controversial subject (Barbusiński, 2009).

In one embodiment, the catalytic system appears to be "self-regenerating" based on the observation that hydrogen peroxide is regenerated, and oxygen is generated, measurable as dissolved oxygen. Without restriction to a theory, in one embodiment, it is believed that the catalytic system of the present invention involves a combination of the Haber-Weiss and Fenton reactions. Haber-Weiss reactions are well-known, where $Fe^{3+}$ iron is reduced by superoxide to form $Fe^{2+}$ and oxygen, as is shown schematically in FIG. 2. Fenton reactions are also well known, where iron improves the use of hydrogen peroxide. It is believed that $Fe^{2+}$ iron reacts with hydrogen peroxide to generate highly reactive oxygen radicals, and the hydrogen peroxide is consumed. The nature of the oxidizing species generated in Fenton reaction is not clearly understood and a wide range of putative intermediates has been proposed (Swern, 1971; Wink et al., 1994; Pierre and Fontecave, 1999; Neyens and Baeyens, 2003; Barbusiński, 2009).

Figure 26:
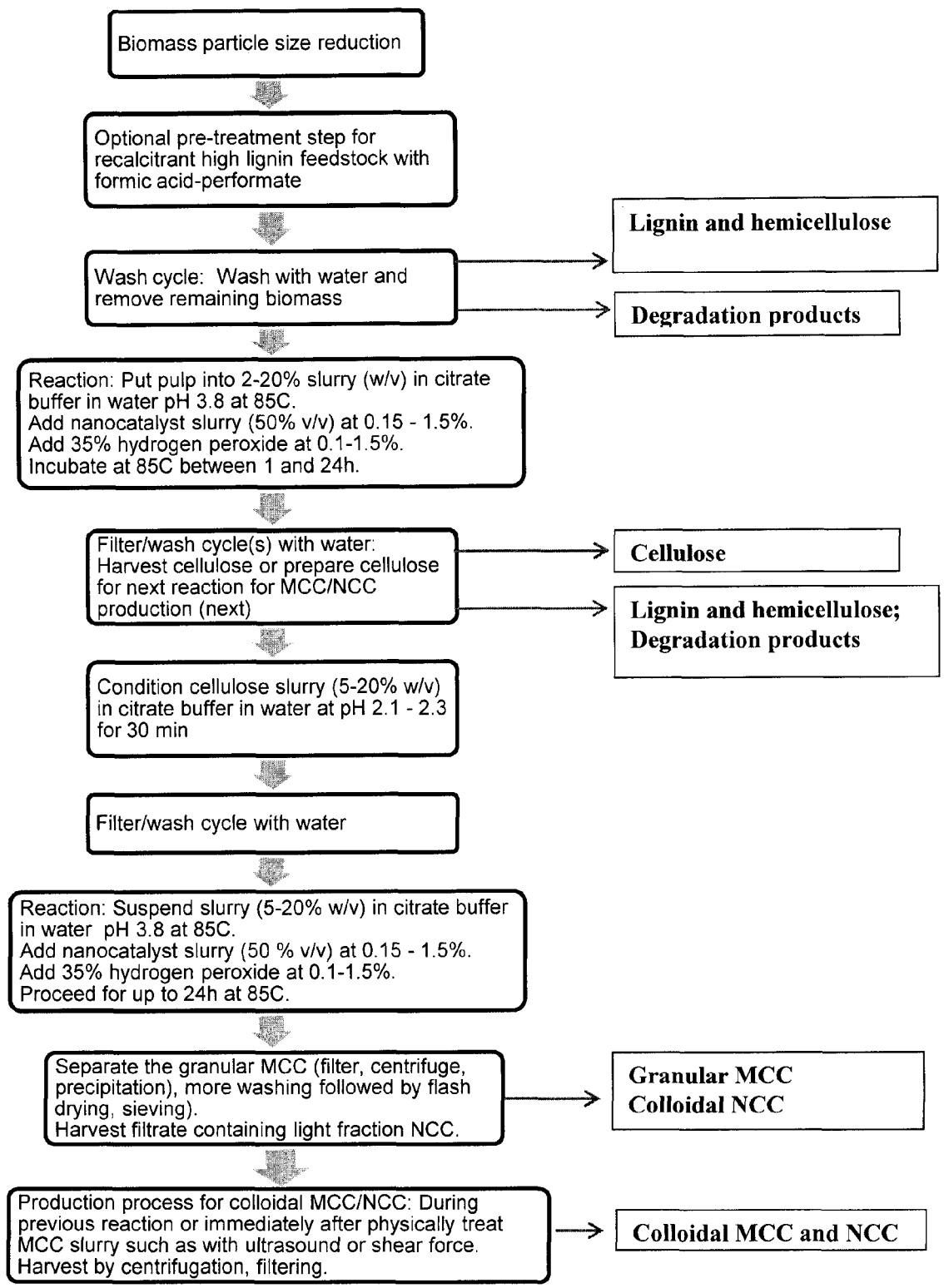
FIG. 26 shows a schematic flowchart of one embodiment of the biorefining process of the present invention.

However, in the catalytic system of the present invention, we have observed that oxygen is produced, and hydrogen peroxide is regenerated. Without restriction to a theory, it is believed that superoxide and hydroxyl radicals are formed, which then recombine and regenerate $Fe^{3+}$ and hydrogen peroxide. These reactions adequately explain the observed net generation of oxygen and the re-generation of hydrogen peroxide in the catalytic system. Accordingly, it is believed that some combination of some or all of the following reactions may be occurring, which are consistent with the net generation of oxygen and regeneration of hydrogen peroxide:

1) $Fe^{2+}+H_2O_2 \rightarrow Fe^{3+}+OH.+OH—$
2) $Fe^{2+}+H_2O_2 \rightarrow Fe(H_2O_2)^{2+}$ and/or $FeO^{2+}$
3) $FeO^{2+}+H_2O_2 \rightarrow Fe^{2+}+O_2+H_2O$
4) $H_2O_2+OH. \rightarrow H_2O+O_2^-+H^+$
5) $H_2O_2+OH. \rightarrow O_2.+H^++H_2O$
6) $H^++OH. \rightarrow HO_2.+H_2O$
7) $Fe^{2+}+HO_2. \rightarrow Fe^{3+}+HO_2^-$
8) $Fe^{2+}+HO. \rightarrow Fe^{3+}+HO^-$
9) $Fe^{3+}+O_2^- \rightarrow Fe^{2+}+O_2$
10) $Fe^{3+}+HO_2. \rightarrow Fe^{2+}+H^++O_2$
11) $Fe^{3+}+HO. \rightarrow FeOH^{3+}$
12) $Fe^{3+}+3OH^- \rightarrow Fe(OH)_3$
13) $Fe^{3+}+O_2. \rightarrow Fe^{2+}+O_2$
14) $H_2O_2+OH. \rightarrow OOH.+H_2O$
15) $OOH.+O_2^- \rightarrow H_2O_2+O_2$
16) $H_2O_2+O_2^- \rightarrow O_2+OH\cdot+OH^-$
17) $H_2O_2+OH. \rightarrow HO_2.+H_2O$
18) $HO_2.+HO_2. \rightarrow H_2O_2+O_2$
19) $H_2O_2+OH. \rightarrow 2H_2O$
20) $2O_2^-+2H^+ \rightarrow O_2+H_2O_2$
21) $HO_2.+Fe^{2+} \rightarrow Fe^{3+}+H_2O_2$
22) $Fe^{2+}+O_2^-+2H^+ \rightarrow Fe^{3+}+H_2O$
23) $HO.+HO_2. \rightarrow H_2O+O_2$
24) $HO.+O_2 \rightarrow >OH^-+O_2$ The general steps of one embodiment of the method are shown schematically in FIG. 26. The method may be applied to various lignocellulosic biomass feedstocks, or to cellulose to obtain more refined variants of cellulose. In one embodiment, the biomass is first processed by particle size reduction and suspension in a water slurry, which may comprise about 2% to 15% (w/v) of biomass. The biomass may be mechanically pre-treated in various manners to improve the end-products or reaction efficacy. In one embodiment, the biomass may initially be chopped or cut to small pieces suitable for grinding or further fiber separation. For example, decorticated hemp bast fiber was dry chopped to 10 mm pieces and was then further pre-processed by wet grinding, resulting in a water-entrained material (Tornado™ Pulper, Bolton Emerson Americas, Inc. Lawrence, Mass.). This material then was then macerated using a low consistency twin-plate refiner. The resulting macerated fiber slurry was then dewatered by passing the slurry through a sidehill screen and a screw press in order to recover the ground fiber.

The biomass may also be chemically pre-treated for catalytic conversion. For example, the biomass may be treated with a pre-hydrolysis step, which may be an acid or an alkaline hydrolysis. Because the catalytic processing is preferably performed at an acidic pH, acid hydrolysis is preferred, otherwise extensive washing may be necessary. In one embodiment, the pre-hydrolysis step comprises treatment with an organic acid or a peracid reagent (PAR), or a combination thereof. Methods for preparation of peracids are well established in chemistry, and such reactions are well-known to one skilled in the art. In one embodiment, the peracid may comprise performic acid (also known as peroxyformic acid), which is prepared by mixing solutions of formic acid and hydrogen peroxide in the presence of phenol as a catalyst. PAR treatments are well known to those skilled in the art (Harmsen et al., 2010).

In one embodiment, the pre-treatment with an organic acid and/or PAR may be particularly useful when the biomass is recalcitrant, and/or contains high lignin content. Biomass comprising flax, hemp straw or wood is known to be recalcitrant to biorefining and have relatively higher lignin content than other biomass. A substantial amount of the lignin and hemicellulose may be removed after such pre-hydrolysis treatment.

In another example, the biomass may be washed in an alkaline or an acidic solution, or in alternating alkaline and acid solutions. This washing process may aid in the removal of unwanted material or coated materials in the biomass.

In an alternative embodiment, the products obtained post-catalytic reaction may be treated by post-hydrolysis and washing steps.

In one embodiment, the catalytic system for biomass treatment is prepared with an aqueous buffer at an acidic pH, and which preferably comprises an organic acid. The pH may be in the range of about 3.0 to about 4.5, and preferably between 3.5 and 3.8. The acidic pH may be achieved with a mineral or an organic acid. Preferably, the organic acid is a polyvalent carboxylic acid.

Without restriction to a theory, the polyvalent carboxylic acid, such as citrate, ascorbate, oxalate or aconitate, acts as a buffer which promotes the cyclical mode of the catalytic reactions, with regeneration of $Fe^{3+}$ and $Fe^{2+}$ and the regeneration of hydrogen peroxide. Redox cycling of copper likely provides further support for $Fe^{3+}$ and $Fe^{2+}$ and hydrogen peroxide cycling. An organic acid buffering system provides a suitable environment (pKa range 3.1 to 6.4) at which the Fenton reaction actively occurs. For example, citric acid provides three ionisable groups with $pK_a$ values for carboxylic acid groups of 3.13, 4.76, and 6.40. Organic acids also have some ability to chelate metal ions and thus keep them in solution at those values of pH where the metals would normally precipitate. Furthermore, the presence of an organic acid can scavenge hydroxyl radicals, which are known to be an important source of oxidative damage in cellulose and a critically limiting factor in the use of the Fenton reaction for the production of high-quality cellulose.

In one embodiment, without restriction to a theory, the redox chemistry of iron-citrate complexes in the iron catalyzed Haber-Weiss reaction may be important. For example, citrate-Fe (II)-dioxygen-citrate Fe (III) complexes are potent catalysts (Minotti and Aust, 1989). Citric acid is ubiquitous in nature, and the catalytic reactions may be based on similar principles of generation of reactive oxygen species (ROS) by some fungi to facilitate the decomposition of wood biomass. However, redox chemistry of iron-citrate complexes still remains poorly characterised (Pierre and Gautier-Luneau, 2000).

In one embodiment, the nanoparticle catalyst concentration is about 1 to 5 mg/ml, and nanoparticles are suspended in a 50% (w/v) slurry in water. The catalyst slurry may then be added at a rate of about 0.15% to 1.5% (v/v) to the biomass citrate slurry.

In one embodiment, the relative Oxidation-Reduction Potential (ORP) of the catalytic system is monitored and used to determine the amount of hydrogen peroxide required for the reaction system to achieve a suitable redox potential, which is preferably approximately 100 mV to 150 mV higher relative to the water used for the reaction. The required amount of oxidant to be added depends on the ORP potential of the biomass slurry. Biomass slurry with greater reducing potential, such as that with greater relative lignin content, will require more oxidant to achieve the target redox potential. In one embodiment, the hydrogen peroxide (35% (w/v)) is added to achieve a concentration in the catalytic system ranges from about 0.1% to 1.5% (v/v). Monitoring of the redox potential allows careful titration of the hydrogen peroxide to the needs of the reaction and provides flexibility in adjusting oxidant need to counter the variable reducing potential of different biomass slurries. Thus, in one embodiment, the use of the redox potential allows efficient optimization of the catalytic reaction in real time, or near real time.

The rate of the catalytic reaction is somewhat temperature dependent. The temperature may range from about room temperature to 95° C. It is not desirable to exceed 100° C., and the reaction proceeds quite slowly and room temperature. Therefore, in one embodiment, the temperature may be between about 50° and 95° C., and preferably above about 80° C.

The length of the catalytic reaction depends on the physical properties of the biomass such as particle size and chemical composition such as the lignin content, the desired end products, temperature, concentrations of reactants, and length of time. The reaction length may be from about 1 hour to 24 hours, or as required, and may be implemented in a flow-through process or in a batch process.

Once the catalytic reaction has proceeded to a desired degree, the cellulose fraction remains as a solid, while the lignin and hemicellulose fractions have largely dissolved in the aqueous slurry. Thus, the cellulose fraction may be separated by any suitable means, such as centrifugation or filtration, while the lignin and hemicellulose fractions remain in solution or in the filtrate. The cellulose fraction may then be washed and harvested.

Figure 11:
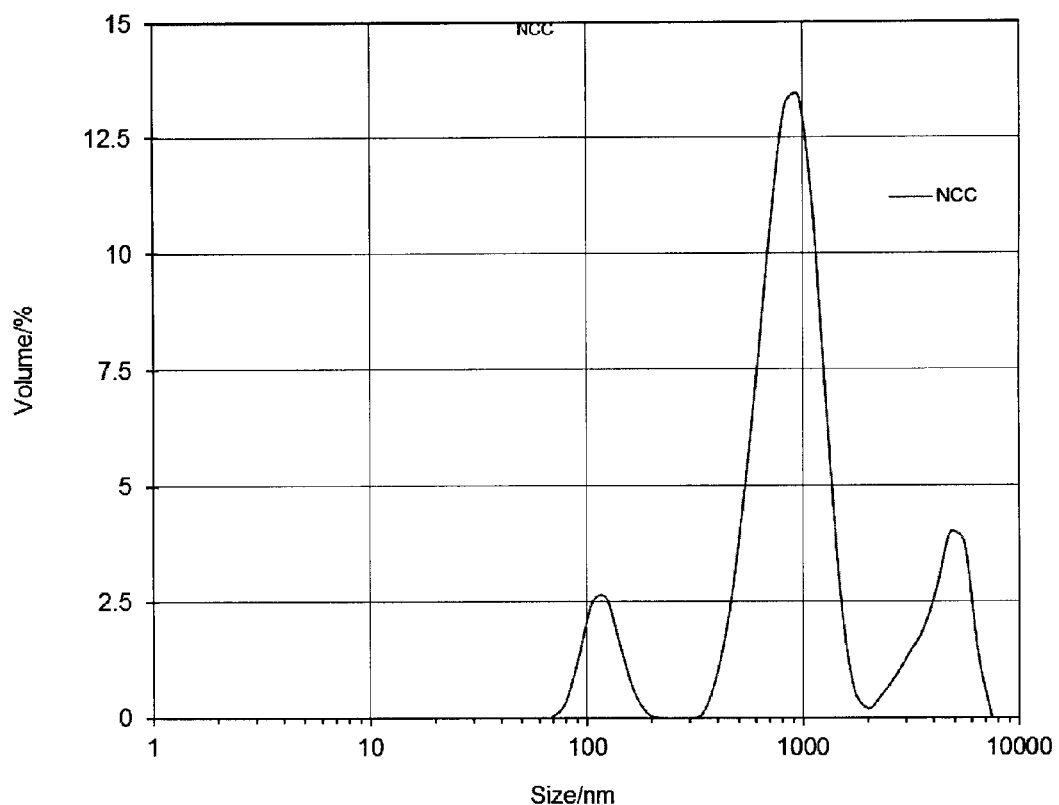
FIG. 11 shows the particle size distribution for the nanocrystalline cellulose (NCC) in the colloid fraction.

In one aspect, the catalytic process may be continued for a sufficient length of time, or repeated to yield crystalline cellulose. This crystalline cellulose comprises primarily granular microcrystalline cellulose having a particle size in the range of about 40 to 50 microns, similar to pharmaceutical grade MCC. The crystalline cellulose may be suspended in water to produce a colloidal suspension, which may comprise of at least two fractions. A heavier fraction comprising primarily of MCC may precipitate and over time form a sediment on the bottom of the vessel. A lighter fraction may remain in suspension and comprises crystalline cellulose having smaller dimensions and resembling nanocrystalline cellulose (NCC). The material isolated from the lighter fraction shows characteristics consistent with the phenomenon of iridescence and morphology consistent with crystal structures. The lighter fraction, if air dried, will form a very thin film, which when crushed in a mortar may yield large aggregates of very fine crystals and/or very small aggregates. The fine crystals have a mean length of about 110 nm, while the small aggregates have a mean length of about 850 nm (ranging 220 nm to about 1800 nm) (FIG. 11). Similar characteristics such as iridescence and film formation were described in US Patent Application No. 2010/0151159 A1. Therefore, we believe that the morphological characteristics observed are indicative of nanocrystalline cellulose.

The granular MCC or the heavier fraction consisting of MCC may then undergo mechanical or physico-chemical size reduction treatment, resulting in a colloidal crystalline cellulose fraction, which comprises colloidal microcrystalline and nanocrystalline cellulose. For example, the crystalline cellulose obtained from a second catalytic reaction may be treated with ultrasound, microfluidized, blended, homogenized, ground or refined, or otherwise treated to reduce particle size. The colloidal cellulose fraction comprises high purity crystals with microscopic morphology identical to the morphology of analytical grade microcrystalline cellulose, and NCC.

The prior art acid digest methods and the oxidative methods using TEMPO and persulfate or peracids for the production of nanocrystalline cellulose (NCC) described in the prior art differ from the method for the production of NCC disclosed herein, consisting of a transition metal based catalytic nanoparticle with hydrogen peroxide in a buffered reaction system.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

EXAMPLES

The following examples are intended to illustrate aspects of the claimed invention, but not be limiting in any manner, unless explicitly recited as a limitation.

Example 1

Preparation of Nanocatalyst

Well water from a farm in Saskatchewan, Canada, having the properties shown above in Table 1, was used. A sodium hypochlorite solution (XY-12; Ecolab Ltd.) was added to the well water at a rate 1 ml per liter of well water. Then, in one batch, a saturated solution of copper carbonate was added at a rate of 100 ml per 20 L. The mixture was agitated vigorously and a very fine suspension of particles formed nearly immediately. The mixture was then allowed to stand for about 30 minutes to complete the reaction and formation of the nanoparticulates. The nanoparticle catalyst sediment was harvested by decanting and centrifugation. The catalyst was washed, first in ethanol (95%) and then in distilled water. The washing in alcohol was included primarily to eliminate possible bacterial contamination which potentially could affect the catalyst in storage or interfere with the catalytic reaction tests which were conducted at room temperature. The catalyst nanoparticles were then suspended to a 50% slurry (w/v) in water.

Table 2 shows the mineral composition of the nanoparticles formed without the addition of copper. Mineral analysis was performed using Inductively Coupled Plasma (Prairie Diagnostic Services, 52 Campus Drive, Saskatoon, SK, Canada). The results show the nanoparticles are heterogeneous in mineral composition, with iron and calcium being the primary constituents.

TABLE 2

Mineral composition of catalytic nanoparticles precipitated from well water.

| Mineral | Concentration | Units |
| --- | --- | --- |
| Iron | 2,997 | mg/L |
| Calcium | 565.3 | mg/L |
| Manganese | 44.3 | mg/L |

TABLE 2-continued

Mineral composition of catalytic nanoparticles precipitated from well water.

| Mineral | Concentration | Units |
| --- | --- | --- |
| Zinc | 9.2 | mg/L |
| Sodium | 8.9 | mg/L |
| Magnesium | 6.4 | mg/L |
| Potassium | 0.44 | mg/L |
| Copper | 0.28 | mg/L |
| Cobalt | 1.67 | µg/L |
| Selenium | <80 | ng/L |

Scanning Electron Microscope (SEM) and Scanning Transmission Electron Microscope (STEM) images (FIG. 1A, B, C) of the nanoparticles were recorded with a Hitachi S-5500 SEM. The samples were deposited and dried on lacey carbon film coated copper mesh TEM grids. The SEM images in FIGS. 1A and 1B show that the nanoparticles are spherical with a size range from 50-100 nm and with extensive and irregular aggregation. FIG. 1B shows nanoparticles ranging in size from 50-100 nm with irregular surfaces with small protrusions ranging from about 5-20 nm. The STEM (FIG. 1C) shows clustered nanoparticles with spheres with a size of about 10 nm.

X-ray Diffraction (XRD) (FIG. 1D) was performed on a Bruker D8 Discover equipped with Cu Kα source and Bruker HiStar GADDS detector. The sample was run as a liquid suspension/slurry in a quartz tube. X-ray Photoelectron Spectroscopy (XPS) was performed using a Kratos Analytical, Axis-Ultra was performed using monochromatic Al Kα X-ray irradiation at a photon energy of 1486.6 eV. The instrument was calibrated using the C(1s) signal (binding energy=284.9 eV). The sample was deposited and dried on a silicon wafer.

Figure 1D:
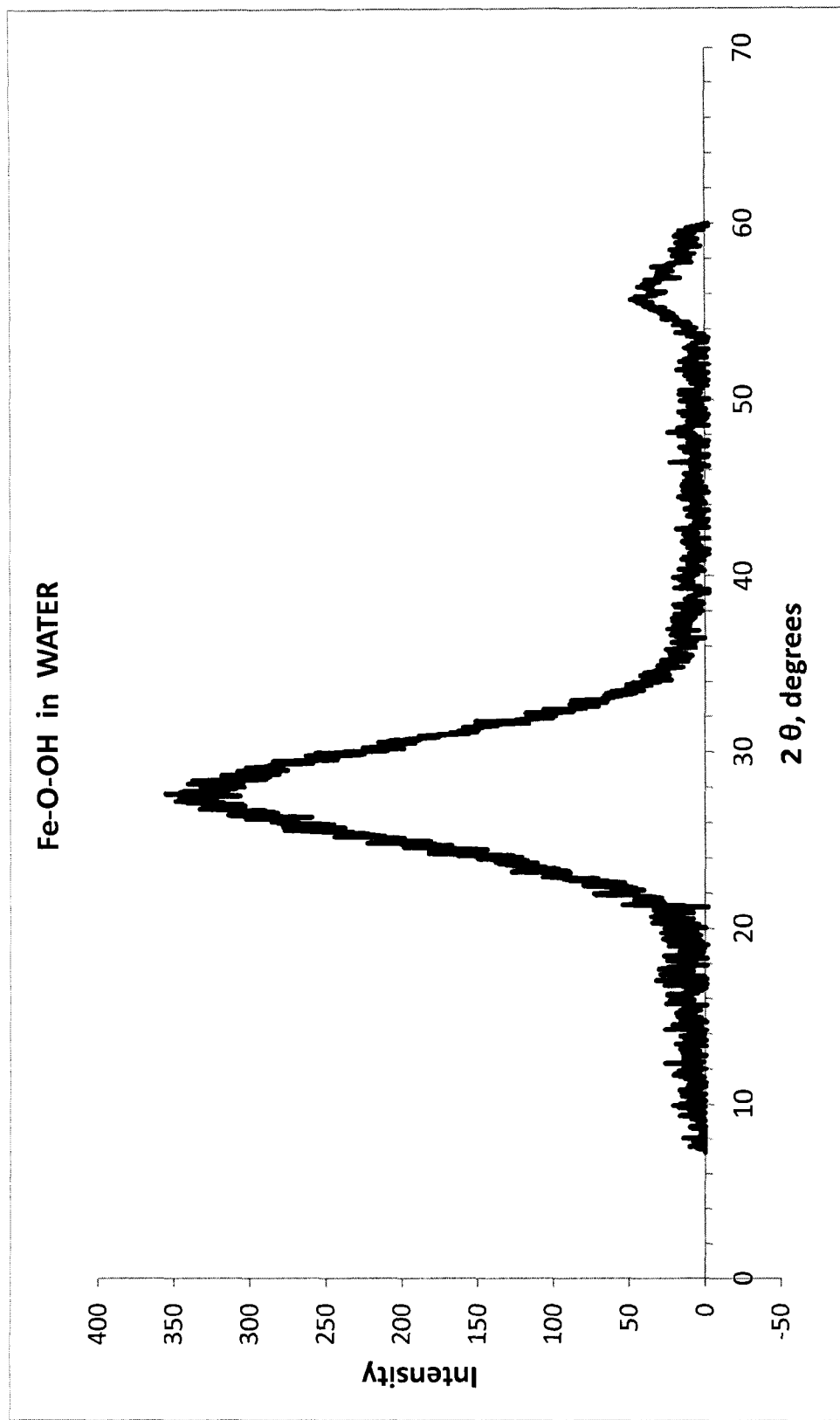
FIG. 1D shows an X-ray diffractogram of the nanoparticles.
Figure 1E:
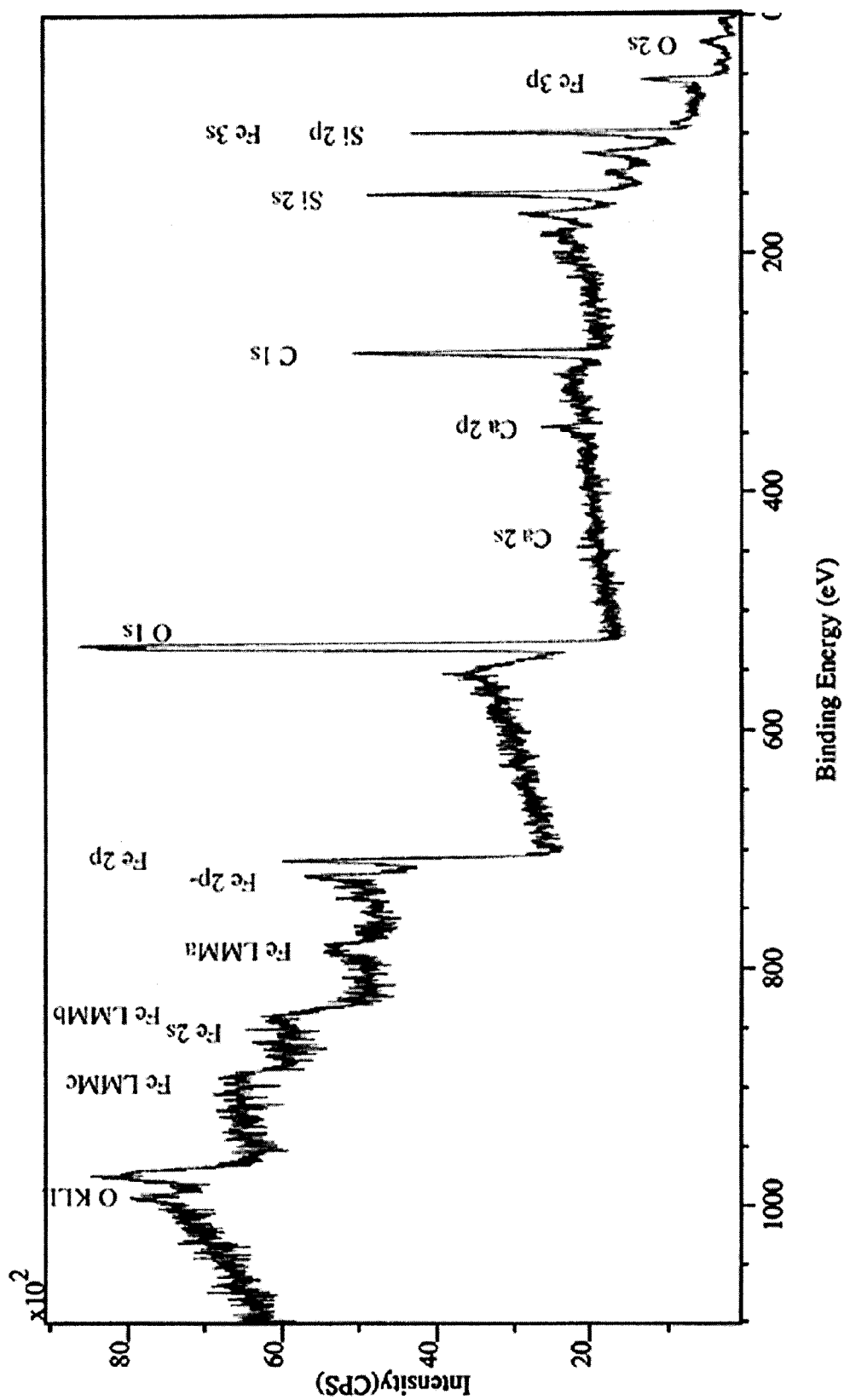
FIG. 1E shows XPS analyses of full surface composition of the nanoparticles.
Figure 1F:
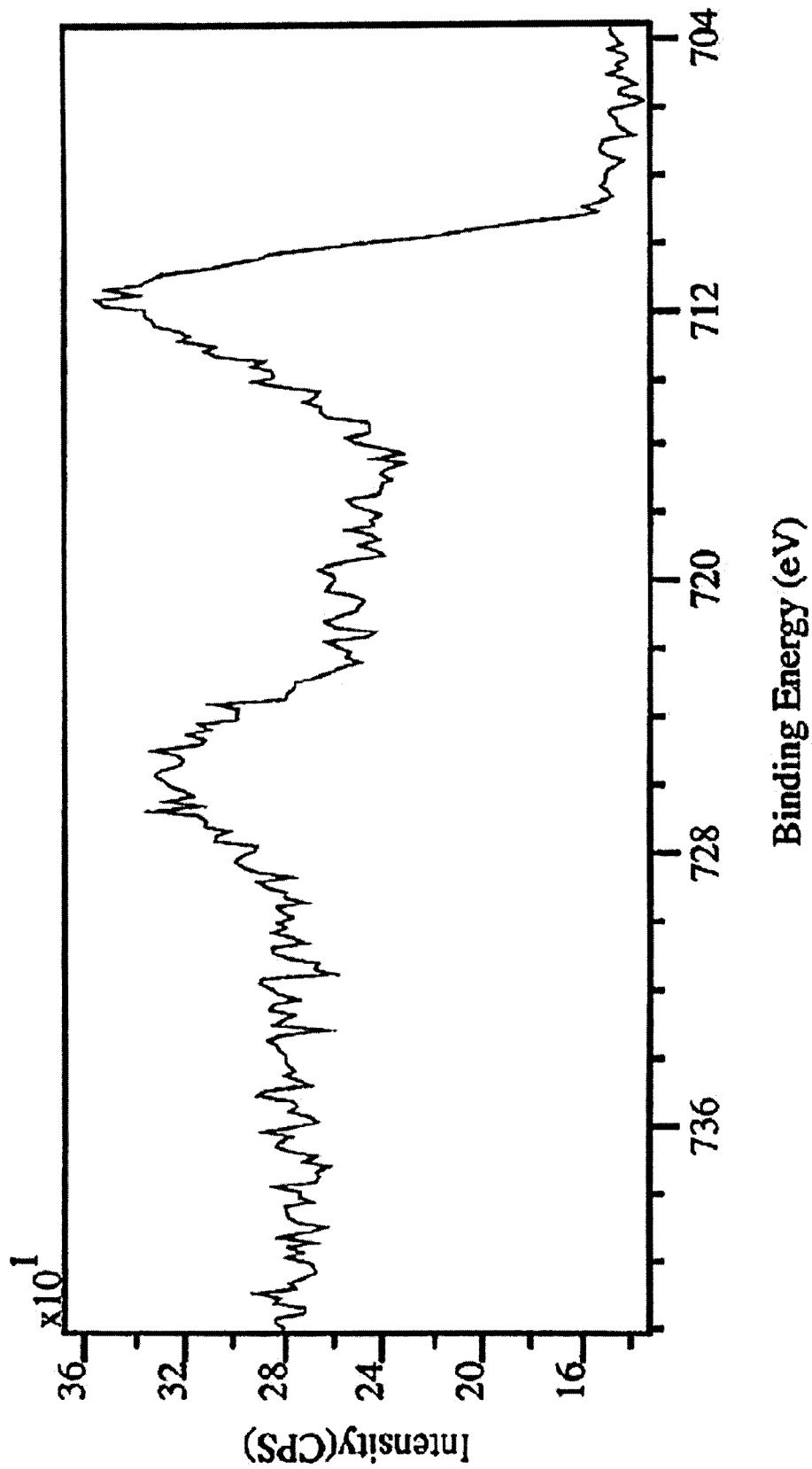
FIG. 1F shows XPS analyses of the Fe 2p core levels of the nanoparticles.

The XRD spectrum in FIG. 1D shows diffraction peaks which correspond to a Fe oxide hydroxide pattern of the ICCD data base Powder Diffraction File number 01-089-6096, FeO(OH). The extreme broadness of the peaks suggests the presence of undeveloped, unequilibrated colloidal sized, essentially amorphous particles. FIG. 1E shows the analysis of the nanoparticle surface composition with Fe 2p core levels in FIG. 1F, indicating that the nanoparticles contain multivalent iron with a mixture of iron oxides and iron hydroxides. These data, taken together with the mineral composition, suggest that the iron nanoparticles have a core of calcium carbonate, and that the nanoparticles are mostly in the size range of 50-100 nm, with highly irregular and extensive aggregation, and with irregular surfaces including small protrusions in the range of 5-20 nm. SEM, STEM, XRD and XPS analyses were provided through the National Institute for Nanotechnology, 11421 Saskatchewan Drive, Edmonton, AB, Canada.

Example 2

Dissolved Oxygen Testing

Figure 3A:
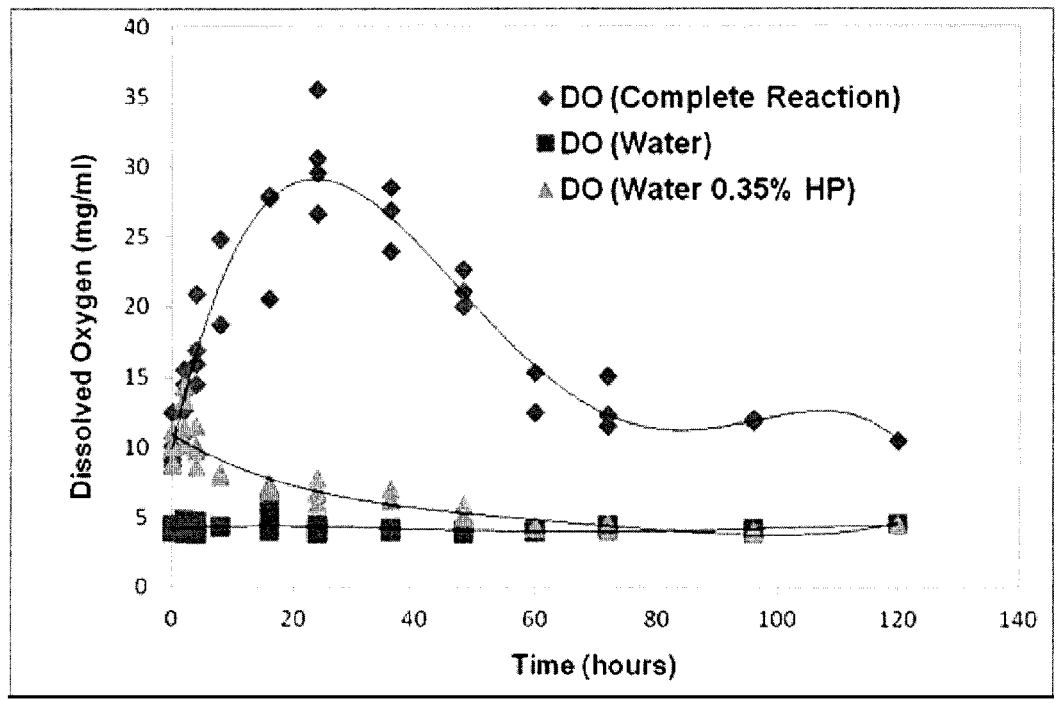
FIG. 3A shows a comparative study of dissolved oxygen (DO) levels in a complete reaction with the catalyst in water and in water containing 0.35% of hydrogen peroxide.

The complete reaction system was tested extensively with various permutations of the catalyst. As a benchmark parameter for robustness we adopted measurement of dissolved oxygen (DO). FIG. 3A shows a comparative study of dissolved oxygen (DO) levels in the catalytic reaction system (as described below in Example 3), water, and water containing 0.35% (v/v) of hydrogen peroxide.

Notably, in comparison to a control of water containing only 0.35% hydrogen peroxide and no catalyst, there is a consistent net gain of DO in the complete reaction. Data showing DO levels in water provides a benchmark for basal levels when medium DO is fully equilibrated with atmospheric oxygen. It is also noteworthy that net generation of oxygen in the reaction system is sustained at a high level for at least 120 hours, whereas for the control system containing only 0.35% hydrogen peroxide, DO is considerably lower and dissipates rapidly, reaching basal level after 60 hours.

Figure 3B:
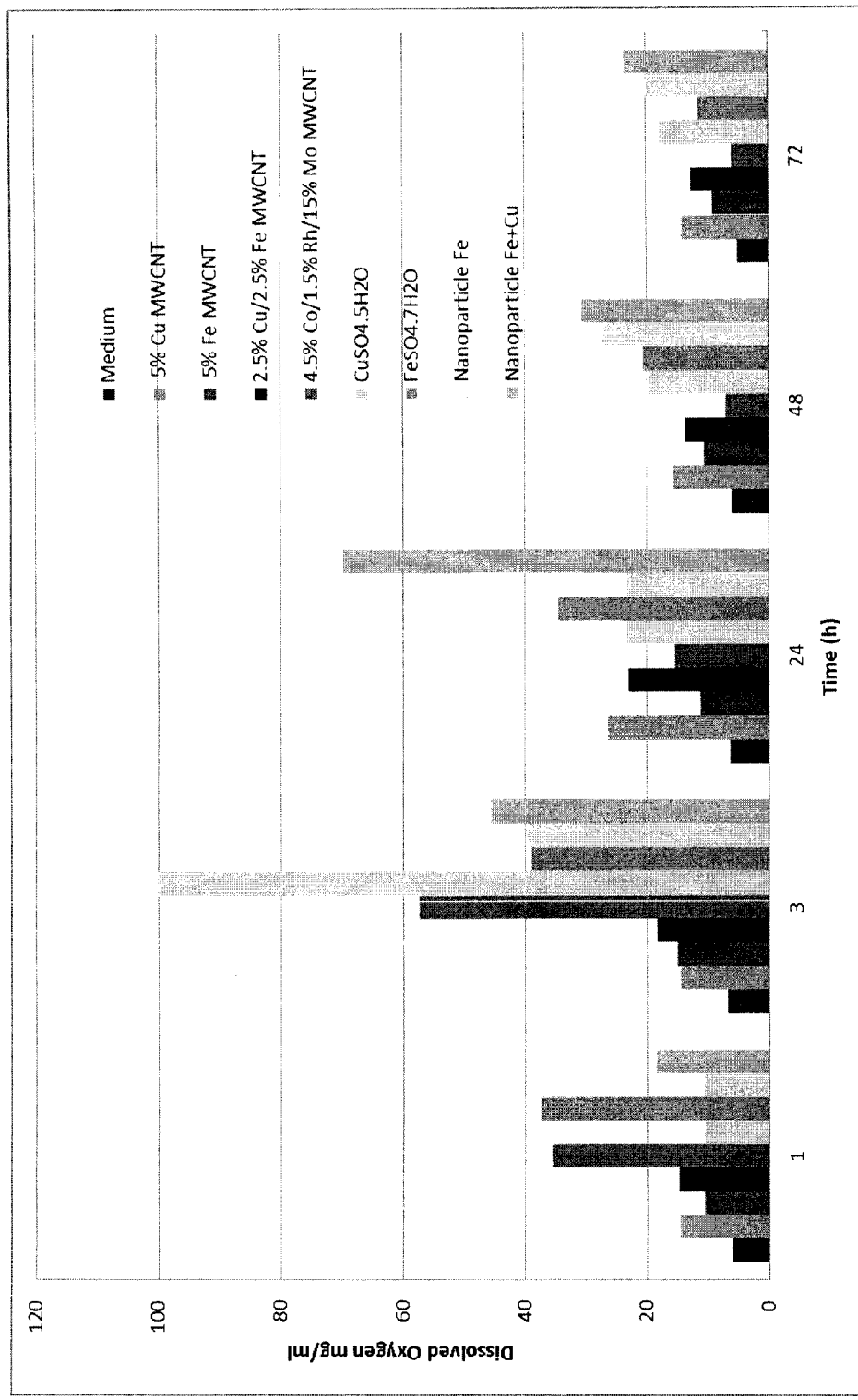
FIG. 3B is a graph showing the catalytic activity of various transition metal based catalysts including solid carbon nanotube-supported catalysts and transition metal salt catalysts (10 mg each), and the nanoparticle catalysts containing either Fe or Fe+Cu to increase dissolved oxygen in the reaction system in citrate-buffered water (pH 3.8) and 0.35% H2O2. (Content of transition metals in the catalysts is not on an equimolar basis; MWCNT—multi walled carbon nano tubes).

FIG. 3B shows that transition metals either in salt form, or as multi walled carbon nano tubes (MWCNT) impregnated with Fe, Cu, Cu and Fe, or with Mo, Rh and Mo all catalyzed the reaction as measured by oxygen generation. 10 mg of each catalyst were used in the reaction system in citrate-buffered water (pH 3.8) and 0.35% $H_2O_2$. The nanoparticle catalysts reported herein were similarly effective; however, the nanoparticle Fe+Cu appeared to provide a more sustained response. The MWCNT catalysts were provided by A. Dalai and P. Boahene, Department of Chemical & Biological Engineering, University of Saskatchewan, Saskatoon, SK, Canada. The general method of synthesis of these catalysts has been described (Abbaslou et al. 2008; Surisetty et al. 2010).

Example 3

Cellulose Extraction Using the Catalytic Reaction

The steps described below are based on 100 ml of total reaction volume. Hemp biomass material reduced to a suitable size (between 250 and 1,250 microns) is placed in reverse osmosis (RO) water at a rate of 5 g per 100 ml and thoroughly mixed with a magnetic stirrer. Once a uniform slurry is obtained, this preparation was titrated with citric acid to obtain a pH level between 3.5 and 3.8. This preparation is thoroughly mixed, and incubated at room temperature for a few minutes. The pH was tested again, and re-adjusted. The suspension of catalyst from Example 1 was added to a concentration of 1% (v/v) and thoroughly mixed with the biomass slurry. Hydrogen peroxide (35%) was then added to a final concentration of 1% (v/v) and a redox potential (ORP) of approximately between 100-150 mV relative to water, and the slurry was mixed thoroughly. The slurry was incubated at room temperature for a few minutes. The pH was checked and re-adjusted to a level between 3.5 and 3.8 with citric acid as described above.

The complete reaction mixture was then incubated on a hot plate at approximately between 50° and 95° C. with constant stirring. After approximately one or two hours, the catalytic process was then terminated by filtering and washing the cellulose pulp with water. Once the extraction process is terminated, various procedures well known to those skilled in the art may be used to wash, separate and dry the cellulose pulp.

Several mineral and organic acids in various permutations were initially tested to obtain the acidic pH in the aqueous slurry comprising the catalyst, including hydrochloric acid, aconitate, oxalate, and citrate. All organic acid compounds performed reasonably well; however, for the cellulose extraction studies reported here a citrate based catalytic system was used. A small amount of ascorbate can be added to control excess hydroxyl radicals if it is desired to further reduce the risk of oxidative damage to the end products.

The dried cellulose pulp was then resuspended in an aqueous slurry, and the catalytic reaction was repeated to produce a crystalline cellulose fraction.

Example 4

Processing of Decorticated Hemp Bast Fiber

Figure 4:
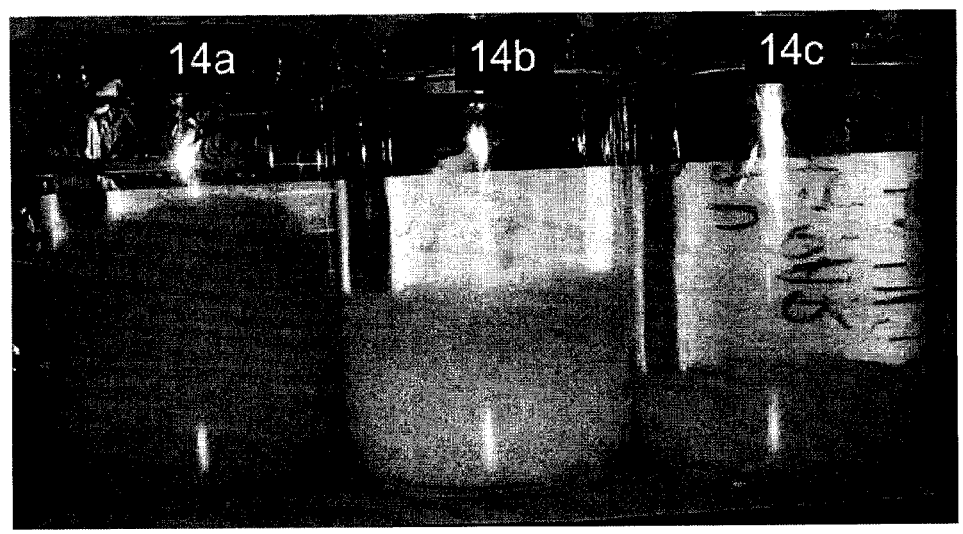
FIG. 4 shows cellulose fibers resulting from catalytic processing of raw hemp fiber, and with post-reaction treatment with peroxy formic acid (performate) reagent.

Hemp bast fiber, obtained from Alberta Innovates—Technology Futures, was decorticated from hemp straw in accordance with the process described in U.S. Pat. No. 7,669,292. The decortication was not complete and some shives remained in the bast fiber. Shive contamination of hemp pulp is known and is reported in the literature. The hemp bast fiber, as received and not further ground, was used in the catalytic reaction described in Example 3 above, and yielded good quality cellulose fibers, but some undigested shives were present (Sample 14A in FIG. 4).

A performate reagent (PAR) was produced by combining 450 ml of 88% formic acid with 50 ml of hydrogen peroxide (35%) and reacting this with 2.5 g phenol for one hour. This performate was used to digest residual shives after the catalytic reaction. Samples 14B and 14C shown in FIG. 4 contained samples further processed with PAR. Sample 14B received a single PAR treatment and Sample 14C a double PAR treatment. PAR treatment was effective at reducing (14B) or substantially eliminating (14C) residual shives.

Example 5

Processing of Decorticated Flax Bast Fiber

Figure 5:
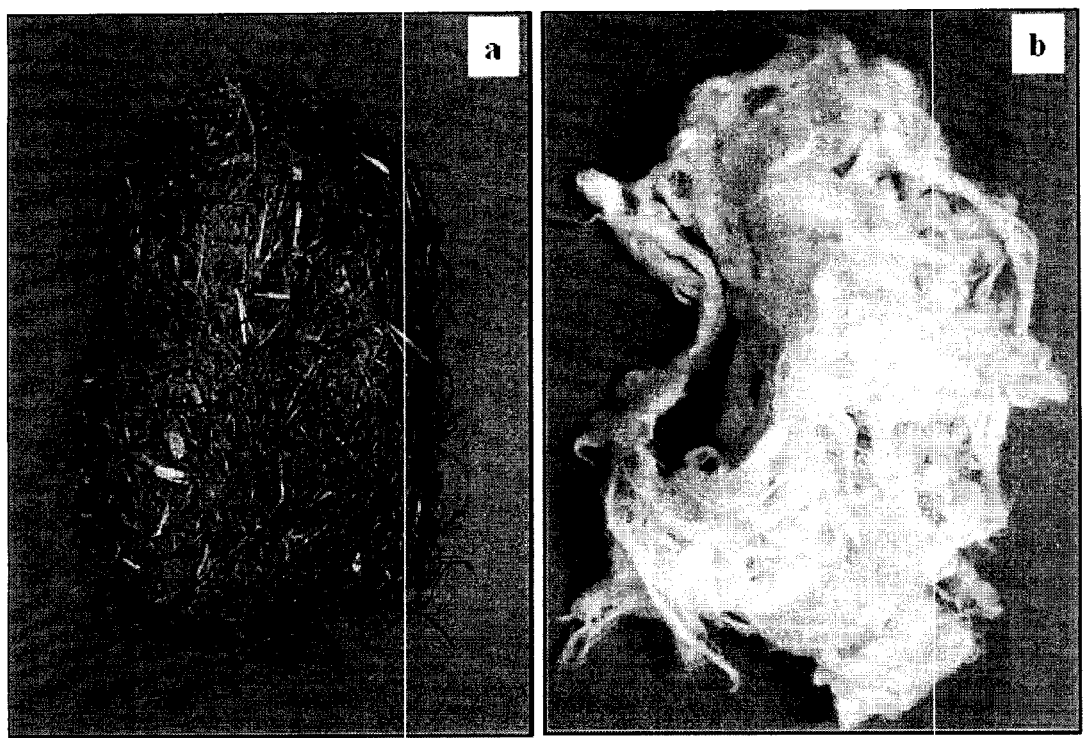
FIG. 5 shows flax bast fiber (a) which after the catalytic reaction was converted into bright white fiber (b) remarkably similar in appearance to cotton.

Decorticated flax bast fiber obtained from Biolin Research Inc. Saskatoon, SK, Canada with some residual shives (FIG. 5; panel a) was processed as described in Example 3, without pre-hydrolysis or post-hydrolysis (PAR). The catalytic process converted the flax bast fiber into bright while cellulose fibers with cotton-like appearance (FIG. 5; panel b).

Example 6

Processing of Decorticated and Mechanically Pre-processed Hemp Bast Fiber

Decorticated hemp bast fiber from Example 4 was dry chopped to 10 mm pieces and was then further pre-processed by wet grinding, resulting in a water-entrained material (Tornado™ Pulper, Bolton Emerson Americas, Inc. Lawrence, Mass.). This material then was then macerated using a low consistency twin-plate refiner. The resulting macerated fiber slurry was then dewatered by passing the slurry through a sidehill screen and a screw press in order to recover the ground fiber.

Figure 6:
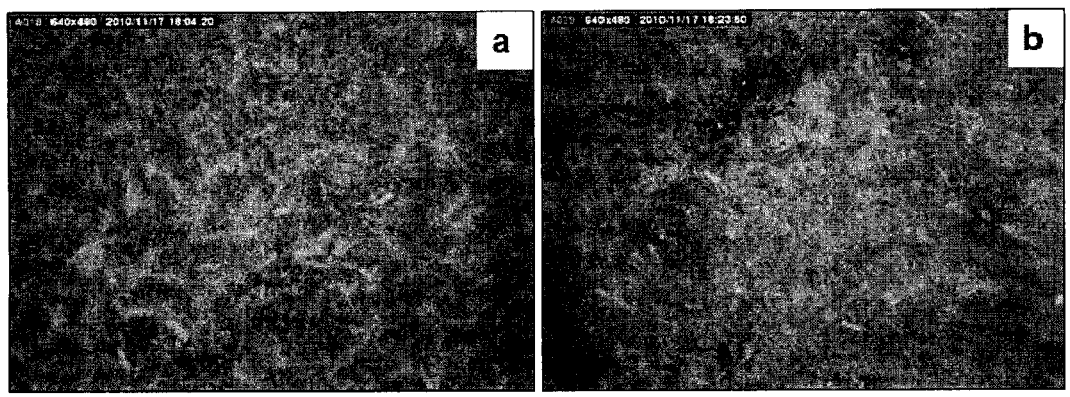
FIG. 6 shows microphotographs of cellulose after the catalytic reaction obtained from hemp not mechanically pre-processed for particle size reduction (a) and from hemp that was mechanically pre-processed for particle size reduction (b).

The recovered ground fiber was then subjected to the catalytic process described in Example 3. As shown in FIG. 6, microscopic pictures of dried pulp obtained from mechanically pre-processed hemp followed by catalytic processing show presence of microscopic shives (panel A), demonstrating the recalcitrance of the shives during mechanical treatment. The presence of shives can be nearly completely eliminated by short post-hydrolysis with PAR (panel B) or alternatively by pre-hydrolysis. The mechanically pre-processed decorticated hemp was converted by the catalytic reaction into cellulose pulp with characteristics similar to that of blot paper, which is 98% pure cellulose.

Example 7

Crystalline Cellulose from Flax and Hemp

Figure 7:
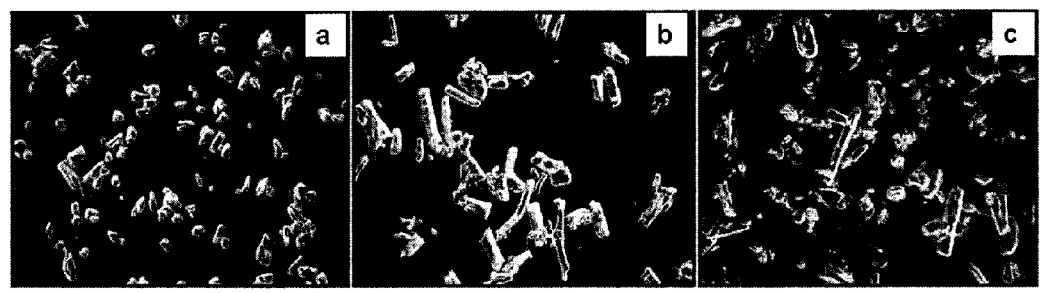
FIG. 7 shows 400× magnification of crystalline cellulose obtained from hemp (a), flax (b) and compared to analytical grade MCC (c).

FIG. 7 shows photomicrographs of material crystallized from various crystalline or colloid fractions obtained from mechanically pre-processed hemp and flax straw treated using the catalytic reaction described in Example 3. The material obtained from hemp (Panel a) and flax (Panel b) showed morphological characteristics identical to analytical grade MCC (Panel c). Original magnification is 400×. It may be seen that the cellulose crystals obtained from hemp (Panel a) exhibit greater uniformity than those of analytical grade MCC.

Figure 8:
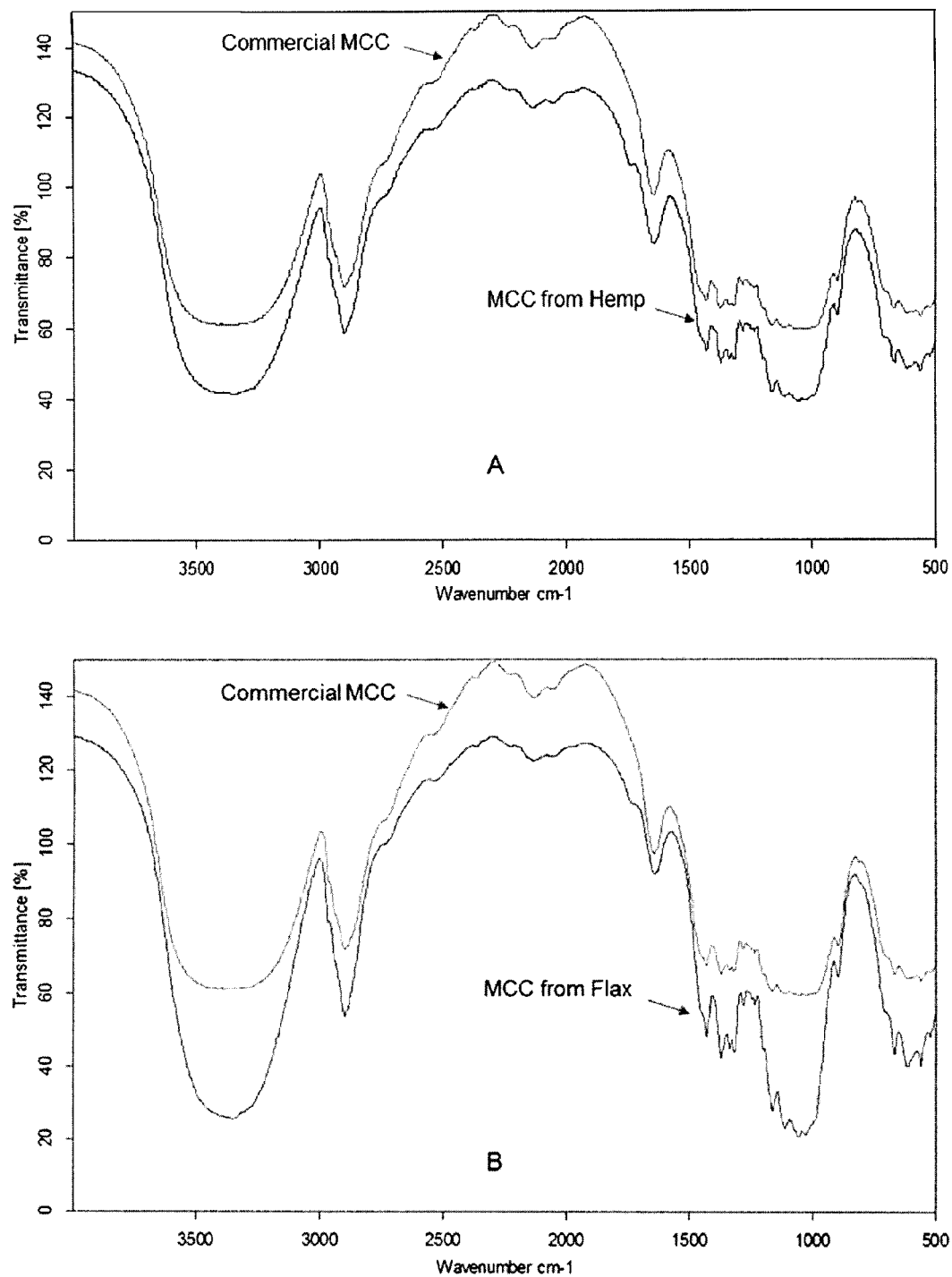
FIG. 8 shows infra-red spectra of catalytically processed crystalline material isolated from colloidal fractions obtained from hemp (top panel) and flax (bottom panel) (blue tracings) over-imposed with spectra from analytical grade MCC (red tracings).

The crystalline cellulose was further analyzed using FTIR and the results confirmed that spectra of crystals obtained from hemp or flax are identical to spectra obtained from analytical grade MCC (FIG. 8). Furthermore, the FTIR results showed no evidence of oxidative damage as evident from the absence of characteristic C=O peak at 1735 $cm^{-1}$. FTIR imaging was performed using a Hyperion 3000 IR microscope coupled to a Tensor 27 interferometer (Bruker Optics, Billerica, Mass.). A KBr-supported Ge multilayer beamsplitter and a 64×64 pixel Focal Plane MCT detector (Santa Barbara Corp., Santa Barbara, Calif., USA) were used to measure spectra in the mid-infrared spectral region. Interferograms were recorded by scanning the moving mirror at 2.2 kHz, to an upper frequency limit of 3950 cm−1 and with a spectral resolution of 4 cm−1. 4×4 pixel binning was performed during acquisition. Single channel traces were obtained using the fast Fourier transform algorithm. Data analysis was performed using OPUS version 6.5 (Bruker Optics, Billerica, Mass., USA).

Figure 9:
FIG. 9. A colloid fraction air-dried on glass crystallized in the form of a thin film showing iridescence. This material analyzed under the microscope shows morphology consistent with nanocrystal structures.

Further observation revealed that some post-reaction colloidal suspensions are comprised of a least two fractions. One that precipitates and sediments on the bottom of the vessel by gravity was termed the heavy fraction (HF) and the other fraction that remained in suspension was termed the light fraction (LF). Material isolated from one LF showed very interesting characteristics consistent with the phenomenon of iridescence (FIG. 9). The LF from sample #20c air-dried on glass crystallized in the form of a thin film showing iridescence. This material analyzed under the microscope shows morphology consistent with crystal structures.

Figure 10:
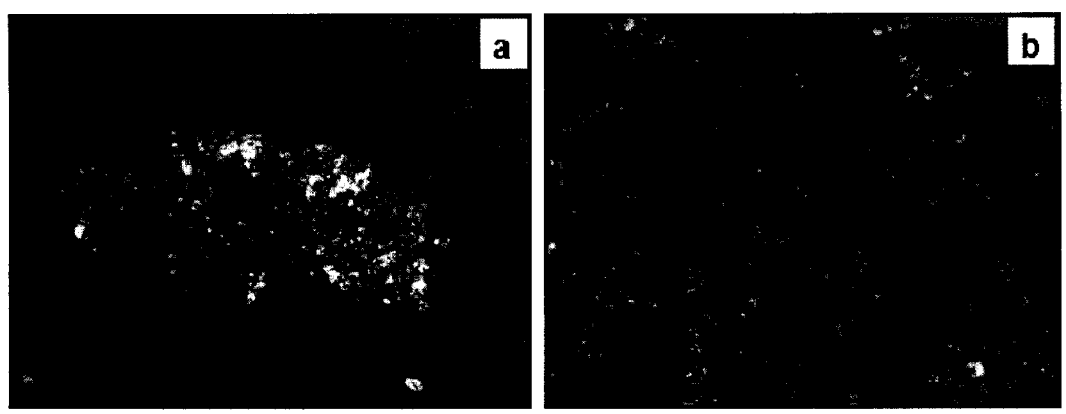
FIG. 10 shows microscope images of material crystallized from colloid present in the liquid fraction obtained from catalytically processed hemp, showing similarity with known nanocrystalline cellulose. Original magnification is 400×.

FIG. 10 shows microscope images of material crystallized from colloid LF obtained from hemp. Notably, the colloidal suspension LF when air dried forms a very thin film, which when crushed in a mortar may yield large aggregates of very fine crystals (panel a) and very small aggregates (panel b). Similar characteristics such as iridescence and film formation were described in the Patent Application US 2010/0151159 A1. Therefore, we believe that the morphological characteristics observed with regard to our samples are indicative of nanocrystalline cellulose. Particle size analysis of the LF (FIG. 11) showed two distinct populations of NCC: one with a mean length of about 110 nm, and one with a mean length of about 850 nm, ranging from about 220 nm to about 1,800 nm.

Example 8

Processing of Flax Shives for Pulp and Crystalline Cellulose

Figure 12:
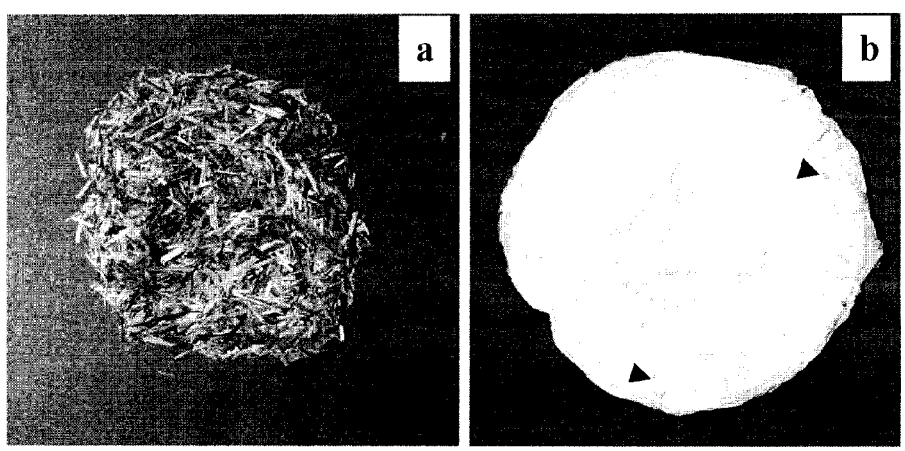
FIG. 12 shows the flax shives biomass used in the catalytic reaction (panel a) and the resulting bright white cellulose pulp with very few residual shives (arrows).
Figure 13:
FIG. 13 shows MCC generated from the flax shives biomass

The flax shives biomass (FlaxBed; Schweizer-Maudit, Canada) used was comprised mostly of small, flat particles approximately 0.5 to 3 mm in length (FIG. 12; panel a). The flax shives were pre-hydrolyzed with PAR as described above in Example 4, which generated substantial lignin. The pre-treated shives were then exposed to the catalytic reaction. The reaction generated cellulose pulp with good whiteness and brightness and was nearly void of remnant shives (FIG. 12;

panel b). The catalytic reaction then was repeated using the flax shives pulp to generate crystalline cellulose (FIG. 13).

Example 9

Crystalline Cellulose from Wood Alpha Cellulose

Figure 14:
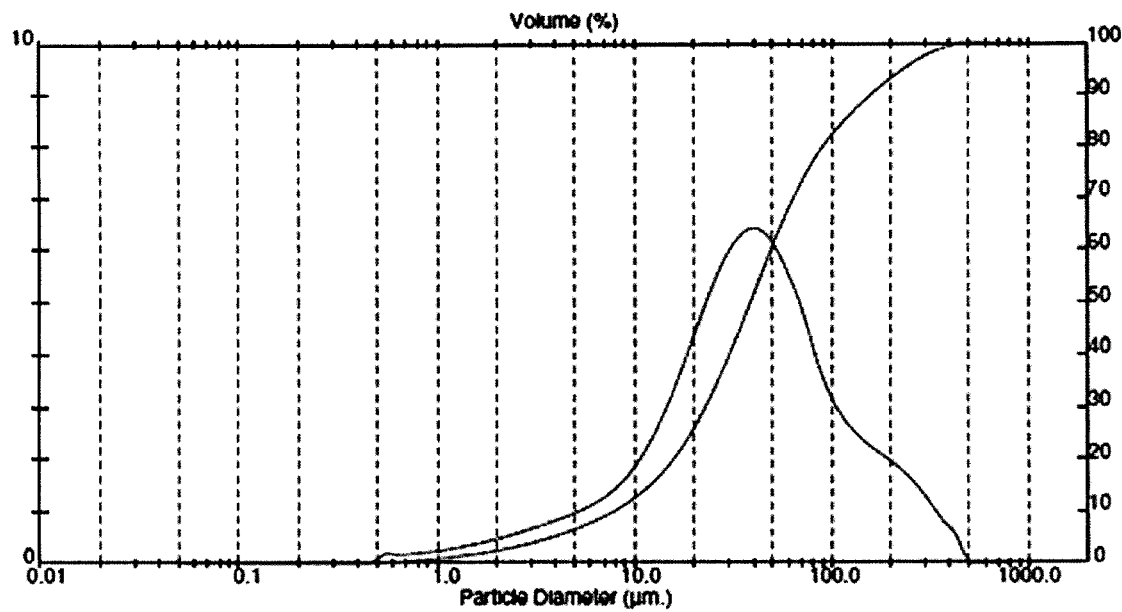
FIG. 14 shows the particle size distribution of MCC produced from dissolving grade cellulose A96 with the catalytic reaction.

A sample of alpha cellulose (96% alpha cellulose; Neucel A96, Neucel Specialty Cellulose Ltd., Port Alice, BC, Canada) was catalytically processed in accordance with the method of Example 3 to produce MCC and the sample submitted for analyses (FPInnovations, Pointe Claire, Quebec, Canada). The results indicated that the sample was composed of mainly cellulosic material with an unusually smooth surface. The particle size distribution (FIG. 14) showed a mean particle size of 38.57 microns. The yield of MCC from the starting material A96 was about 75 to 80%.

Example 10

Catalytic Processing of Thermo-Mechanical Pulp From Wood

Figure 15:
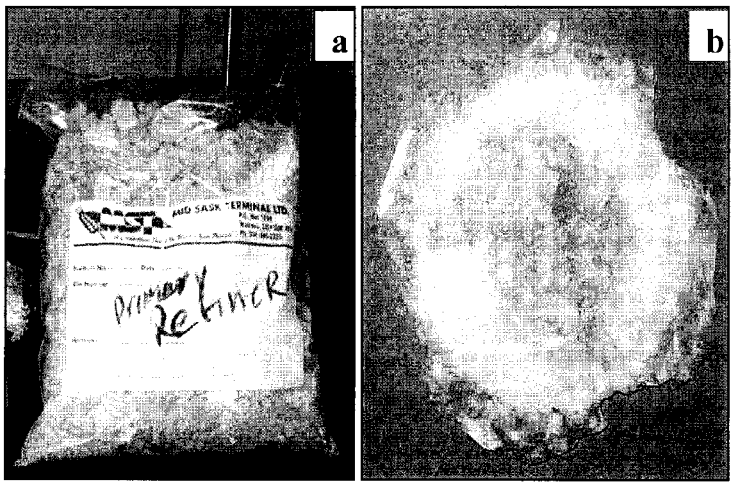
FIG. 15 shows the sample of thermo-mechanical pulp obtained after the primary refiner stage (panel a) and the resulting Kraft-like pulp after the catalytic reaction (panel b).

Thermo-Mechanical Pulp (TMP) from softwood was collected after the Refiner I processing stage from a pulp mill (FIG. 15; panel a). TMP was processed through the catalytic reaction process consisting of one pre-hydrolysis (PAR) step, and successive catalytic reactions with alternating alkaline washes to achieve a cellulose product with very low lignin content and a Kappa # generally less than 2 (FIG. 15; panel b).

Pre-hydrolysis was performed by mixing 80 g of air dried TMP (about 8% moisture) with a mixture (500 ml) of formic acid and performic acid. This mixture was prepared by combining 450 ml of 88% formic acid with 50 ml of hydrogen peroxide (35%) and reacting this with 2.5 g phenol for one hour. The reaction mixture was slowly added to the TMP material and then allowed to digest in a closed vessel at room temperature with intermittent shaking for 24 hours. After this step, the remaining organic matter was filtered through a strainer (2 mm mesh), washed with water, and then made into about 2 to 10% slurry with 2 litres of water. The pH of the slurry was adjusted to about 10.5 to 12 with 50% (W/V) sodium hydroxide, turning the slurry dark brown. The slurry was then filtered through filter paper (VWR No. 28320-121) in a Buchner funnel under vacuum and rinsed with water.

The retained material was made into about 2 to 10% slurry with 2 litres of reverse osmosis (RO) water and the pH of the slurry was adjusted to about 3.7 with citrate. The slurry was then treated as described above in Example 3 for about 3 hours, followed with an alkaline wash as described above. The catalytic reaction and alkaline wash was repeated three times. The yield of cellulose was about 80% and the pulp Kappa # was 1.99. The properties of the pulp were similar to Kraft bleached pulp (FIG. 15; panel b). This confirms that the catalytic process may convert TMP to Kraft-like bleached pulp.

The reaction, including the multiple catalytic cycles, can be adjusted to achieve a target lignin content or kappa #. Fewer catalytic cycles or reduced reaction strength by reducing time or oxidant would result in a higher kappa # and lignin content.

Example 11

Catalytic Processing of Kraft Pulp to Produce Crystalline Cellulose

Figure 16:
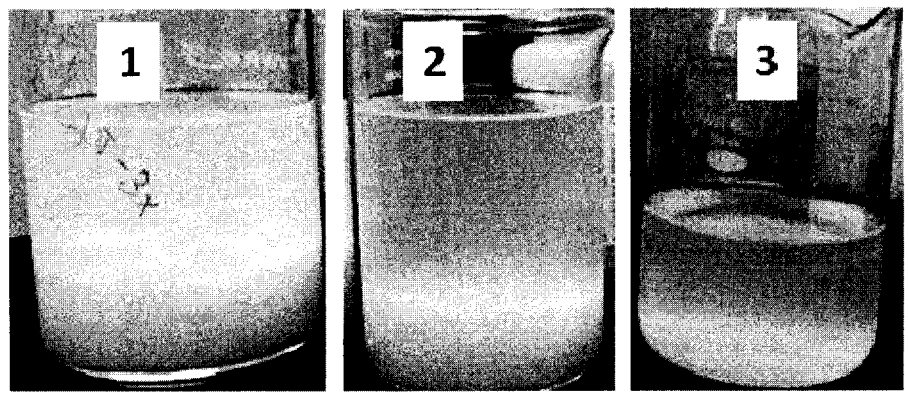
FIG. 16 shows the result of catalytic processing of commercial Kraft pulp (beaker 1) and the base adjusted supernatant from beaker 1 with a light colloidal fraction and heavy fraction containing NCC and MCC respectively (beaker 2). A sample of the light colloidal fraction from beaker #2 was filtered, and the retained material was adjusted to pH 1 in water, heated to approximately 90° C., with resulting flocculation and precipitation of a small amount of MCC at the bottom of beaker #3, with the colloidal NCC fraction above.
Figure 17:
FIG. 17 shows the alkaline wash extract containing lignin from Kraft pulp after the second catalytic reaction.
Figure 18:
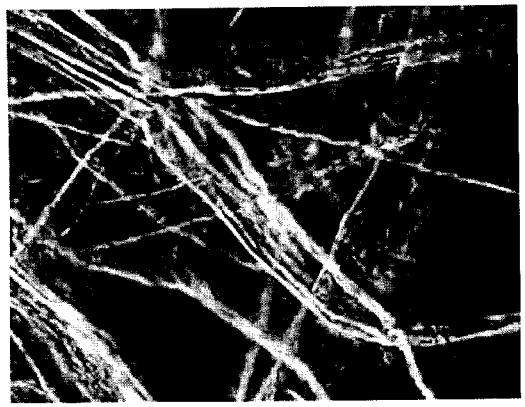
FIG. 18 shows microscope images of the water washed fibers from beaker #1 in FIG. 16; original magnification ×400.
Figure 18:
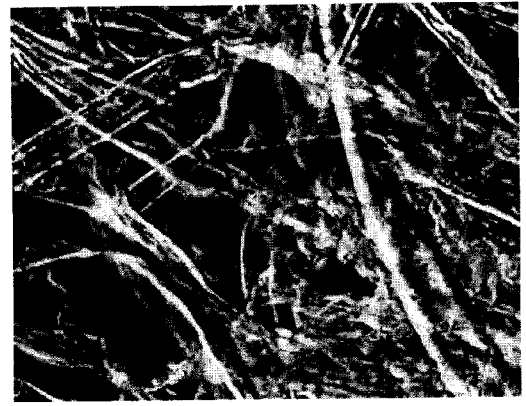
Figure 19:
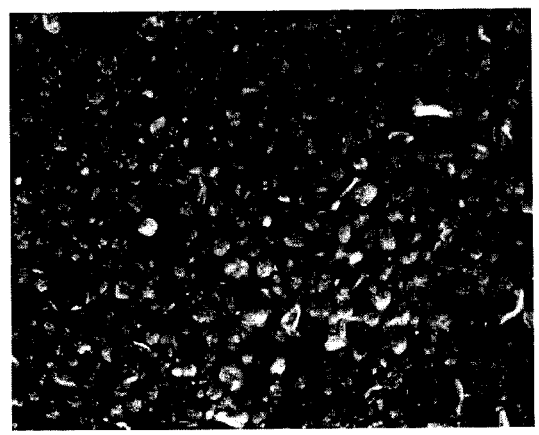
FIG. 19 shows microscope images of the colloid fraction from beaker #1 in FIG. 16; original magnification ×400.
Figure 20:
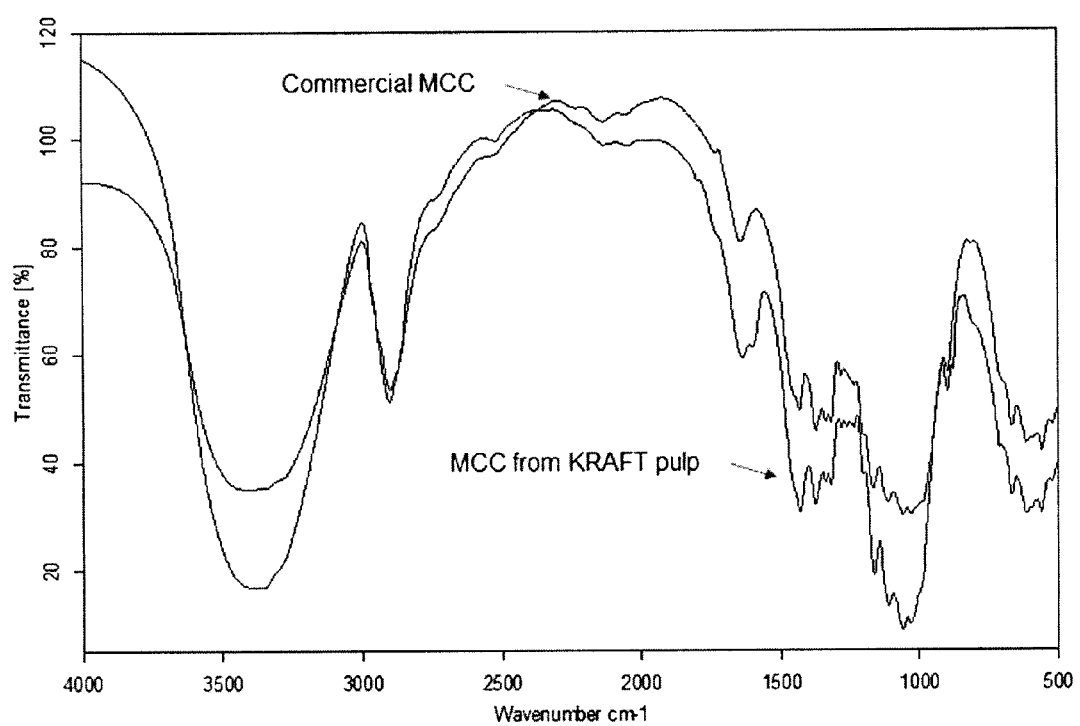
FIG. 20 shows the FTIR spectra of MCC generated from Kraft pulp (top, blue tracing) over-imposed with spectra from commercial MCC (red tracings).

Kraft bleached pulp with a brightness of 89.2 was obtained from a pulp mill, washed in water and exposed to three cycles of the catalytic reaction process. The reaction process produced a mixture in water of cellulose pulp with colloidal crystalline cellulose with a slightly creamy appearance (FIG. 16; beaker 1). The catalytic reaction appeared effective at removing residual lignin from the Kraft pulp, even after the second catalytic reaction, as can be seen from the light brown color in the bottle in FIG. 17. Microscopic images of the pulp fiber (FIG. 18) in beaker #1 shows presence of relatively uniform, smooth fibers. FIG. 19 shows a microscope image of the colloidal fraction of beaker #1 containing MCC and NCC; where the uniformity of the MCC may be plainly seen. The FTIR spectrum for the MCC is similar to that for a commercial MCC (FIG. 20).

Figure 21:
FIG. 21 shows microscope images of the base washed colloid fraction from beaker #2 in FIG. 16; original magnification ×400.
Figure 22:
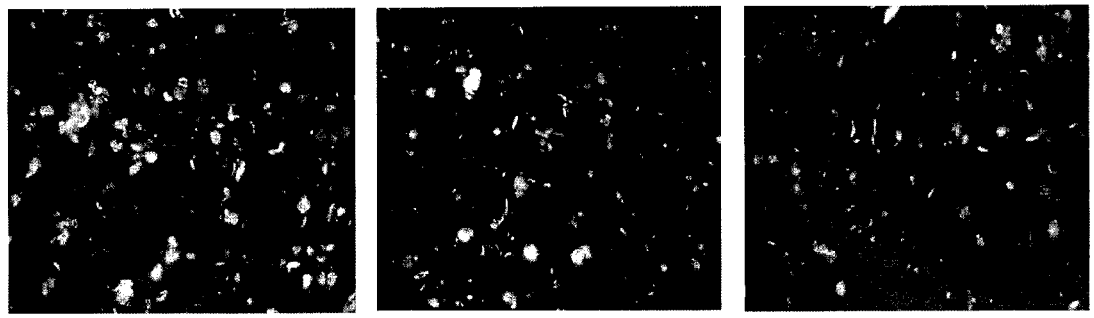
FIG. 22 shows microscope images of the acid washed flocculated material from beaker 3 in FIG. 16; original magnification ×400.

A sample of the supernatant from beaker #1 was removed; the pH adjusted to about 11.5 to 12 with 50% NaOH, and then allowed to stand for 24 h (FIG. 16; beaker 2). This beaker shows separation of the light colloidal fraction on top, rich in NCC, and a heavy precipitated fraction, rich in MCC. FIG. 21 shows microscopic images of the base washed light colloidal fraction in beaker #2 with presence of NCC and MCC. NCC are not measurable with light microscopy but the diffraction and reflection of light from the crystal structures can be used to indicate the presence of the NCC as may be noted particularly for the left panel of FIG. 21. Similar light reflection of MCC shows clearly observable crystal structures as may be noted in the centre and right panels of FIG. 21. A sample of the light colloidal fraction from beaker #2 (FIG. 16) was filtered, and the retained material acid treated by adjusting to pH 1 in water and heated to approximately 90° C. As a result, flocculation and precipitation of a small amount of MCC at the bottom of beaker #3 occurred, with the colloidal solution above (FIG. 16). FIG. 22 shows the presence of the cellulose micro- and nanocrystalline structures in the colloidal solution, with what appear to be subtle differences from the crystalline structures after the base wash (FIG. 21), suggesting that the base and acid treatments may introduce different characteristics in the crystalline cellulose.

Example 12

Figure 23:
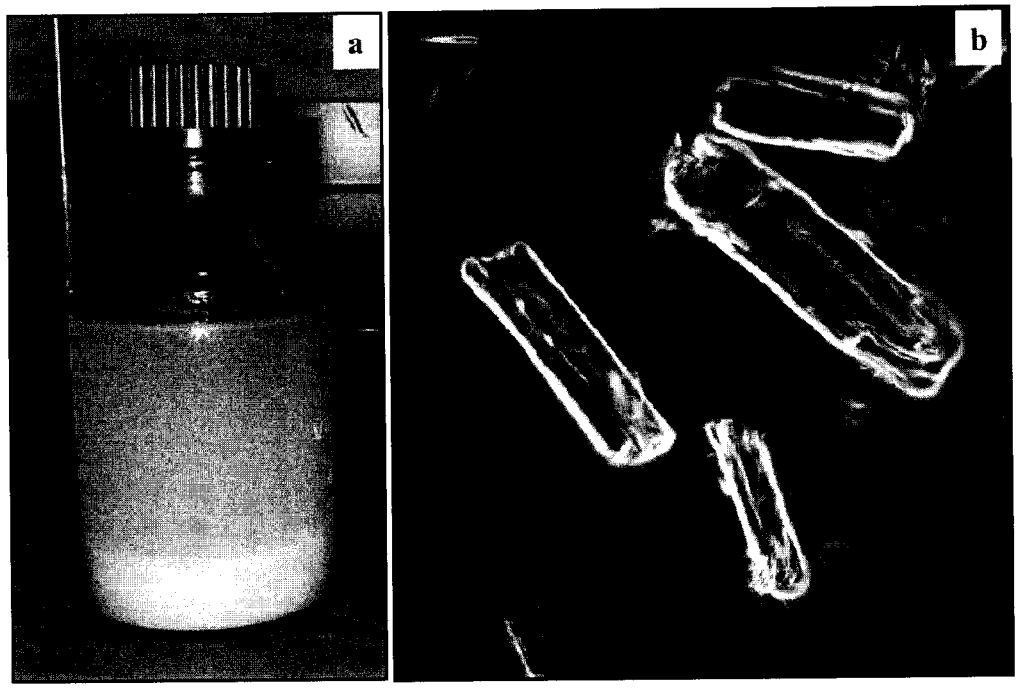
FIG. 23 shows in panel (a) the precipitated heavy fraction consisting of MCC (panel b) and the light fraction containing colloidal MCC and NCC after the catalytic reaction.
Figure 24:
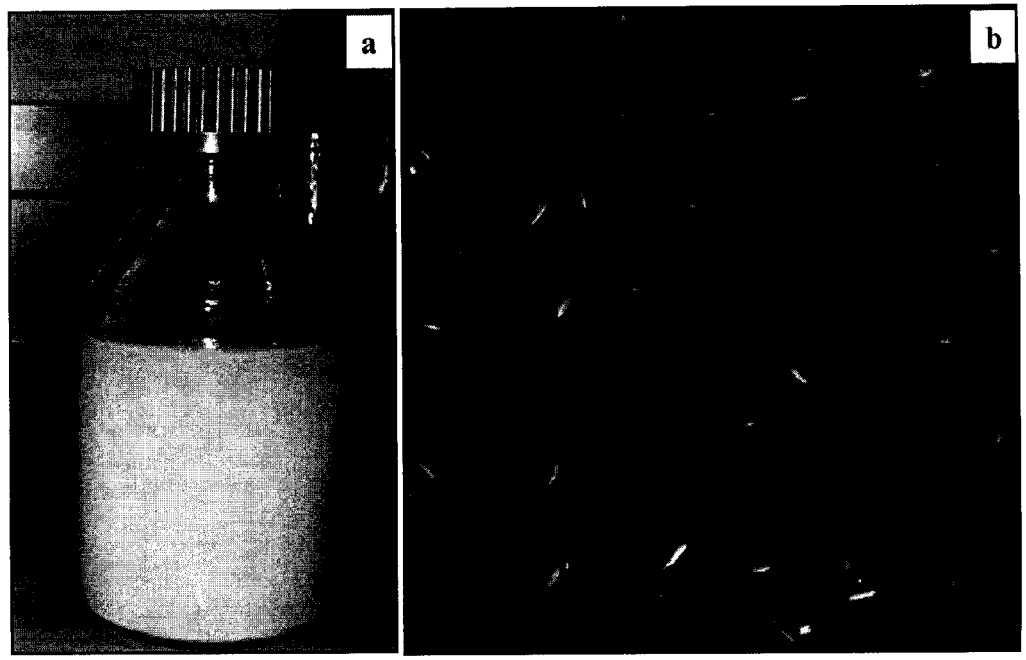
FIG. 24 shows the effect of ultrasonic treatment of the sample in FIG. 23 (a) after sitting undisturbed for 10 days. Panel (a) shows that the light fraction in the supernatant predominates as a colloidal solution and contains colloidal MCC and NCC (panel b).

Post-catalytic Processing of Kraft Pulp for High-Yield Production of Colloidal MCC and NCC In this example, Kraft pulp was processed as described above to produce crystalline cellulose (FIG. 23; panel a) primarily consisting of MCC (FIG. 23; panel b) in the precipitated heavy fraction, with a light fraction of colloidal MCC and NCC in the supernatant. The conversion of the precipitated MCC into colloidal MCC and NCC can then be increased by physical treatments including ultrasonication or mechanical disruption such as using a microfluidizer or a rotary homogenizer. After the catalytic reaction as described above, the filtered and washed medium containing the heavy and light fractions in RO water at pH 7 in a beaker was exposed to ultrasound treatment (Hielscher UIP 1000; Sonotrode BS2d34, 20 kHz, 900 W) for 5 min. The ultrasonication converted the heavy fraction containing the MCC into a solution of colloidal MCC and NCC. FIG. 24 (panel a) shows the colloidal solution after sitting undisturbed for 10 days, and presence of colloidal MCC (<2 micron in length) and colloidal NCC in panel (b). The apparent efficiency of converting MCC into colloidal MCC and NCC was 90%. A similar colloidal solution was prepared using a mechanical homogenizer (results not presented).

Example 13

Catalytic Processing of Kraft Brown Pulp to Produce Kraft-Like Pulp

Figure 25:
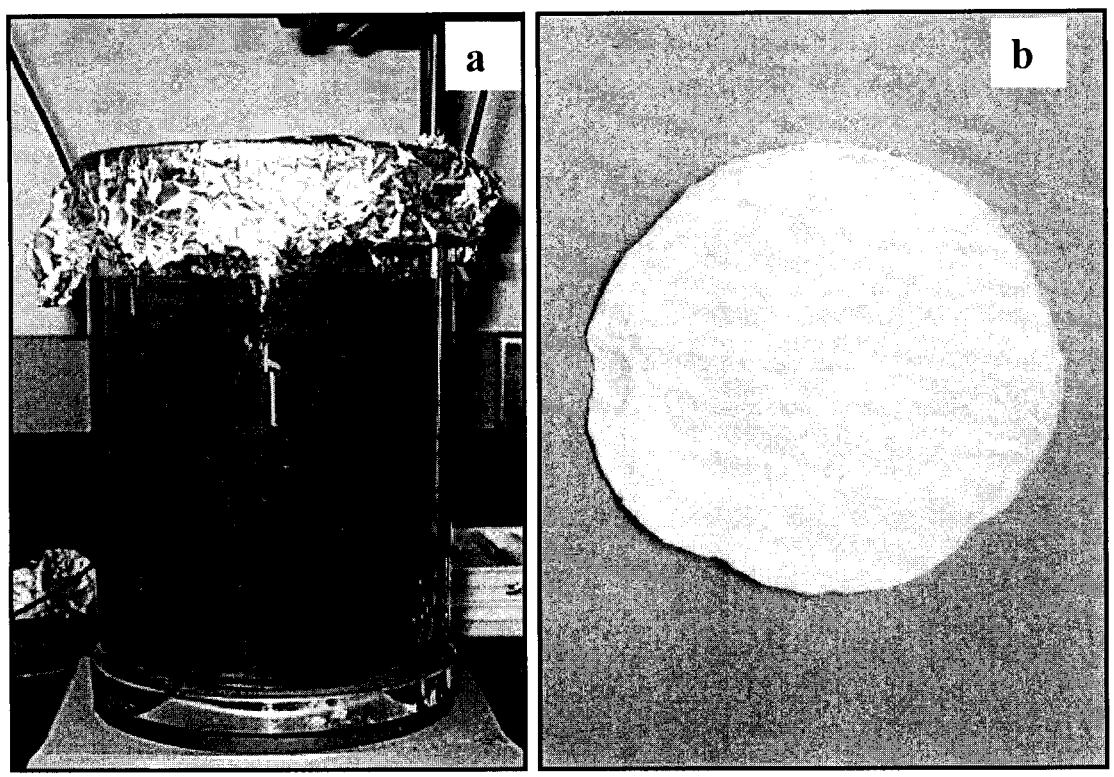
FIG. 25 shows in panel (a) the brown pulp obtained from a commercial pulp mill after the Kraft digest and after washing and neutralization in preparation for the catalytic reaction; and in panel (b) the Kraft-like pulp generated.

The catalytic process may also be used to convert Kraft brown pulp originating from Kraft digesters directly into highly purified cellulose pulp with low kappa #, and further into crystalline cellulose. The major technical and economic advantage is that existing oxygen delignification and peroxide bleaching steps used in Kraft bleached pulp production may be bypassed. Kraft brown pulp was sourced from a commercial pulp mill and had a wet, dark brown mass with air-dry dry matter content of 45% and for this sample the kappa # was approximately 35 as advised by the pulp mill. When dispersed in reverse osmosis water, Kraft brown pulp formed an alkaline slurry (pH ranging from 8.9 to 9.5), and contained water soluble compounds. The brown pulp was first pre-conditioned by soaking in a buffer having a pH of about 2.2 for 30 minutes, and washed extensively with water. The brown pulp was then subjected to the catalytic reaction, without pre-hydrolysis, as described previously for TMP (Example 10). FIG. 25 shows the brown pulp prior to the catalytic reaction (panel a) and the resulting bright white pulp post-reaction (panel b). This pulp is amenable to further catalytic processing to produce crystalline cellulose, and size reduction to produce MCC and NCC.

References Cited:

Any literature, patent or patent application referred to herein or listed below, are incorporated herein in their entirety by reference (where permitted) and are indicative of the level of skill of one skilled in the art.

U.S. Patent Documents:
U.S. Pat. No. 2,078,446
U.S. Pat. No. 2,978,446
U.S. Pat. No. 3,146,168
U.S. Pat. No. 5,580,974
U.S. Pat. No. 6,037,380
U.S. Pat. No. 7,669,292
US 2006/0289132 A1
US 2010/0233481
US 2010/0151159 A1
WO 2011/072365 A1

Other Publications:

Abbasleu, R. M. M., Tavasoli, A. and Dalai, A. K. 2008. Effect of pre-treatment on physico-chemical properties and stability of carbon nanotubes supported iron Fischer-Tropsch catalysts. Applied Catalysis A: General 355 (2009) 33-41.

Bai, W, Holbery, J. and Li, K. 2009. A technique for production of nanocrystalline cellulose with a narrow size distribution. Cellulose 16, 455-465.

Barbusiński, K. 2009. Fenton reaction—controversy concerning the chemistry. Ecological Chemistry and Engineering 16, 247-258.

Cherubini, F. and Strømman, A. H.2011. Chemicals from lignocellulosic biomass: opportunities, perspectives, and potential of biorefinery systems. Biofuels, Bioprod. Bioref. 5: 548-561.

Duran, N. et al. 2011. A Minireview of cellulose nanocrystals and its potential integration as co-product in bioethanol production. J Chil Chem Soc., 56, No. 2.

Filson, P. B. and Dawson-Andoh, B. E. 2009. Sono-chemical preparation of cellulose nanocrystals from lignocellulose derived materials. Bioresource Technology 100: 2259-2264.

Harmsen, P., Huijgen, W., Bermudez, L. and Bakker, R. 2010. Literature Review of Physical and Chemical Pretreatment Processes for Lignocellulosic Biomass. Report 1184, Wageningen UR Food & Biobased Research, Wageningen, The Netherlands. ISBN 978-90-8585-757-0.

Hirota, M., Tamura, N., Saito, T. and Isogai, A. 2010. Water dispersion of cellulose II nanocrystals prepared by TEMPO-mediated oxidation of mercerized cellulose at pH 4.8. Cellulose 17:279-288.

Isogai, A., Saito, A. and Fukuzumi, H. 2011. TEMPO-oxidized cellulose nanofibers. Nanoscale 3, 71-85.

King, D. 2010. The Future of Industrial Biorefineries. King, D. Ed. World Economic Forum. REF: 210610; www3.weforum.org/docs/WEF_FutureIndustrialBiorefineries_Report_2010.

Klemm, D., Kramer, F., Moritz, S., Lindström, S., Ankerfors, M., Gray, D. and Dorris, A. 2011. Nanocelluloses: A New Family of Nature-Based Materials. Angew. Chem. Int. Ed. 50, 5438-5466.

Leung, A. C. W., Hrapovic, S., Lam, E., Liu, Y., Male, K. B., Mahmoud, K. A. and Luong, J. H. T. 2011. Characteristics and Properties of Carboxylated Cellulose Nanocrystals Prepared from a Novel One-Step Procedure. Small 7, 3, 302-305.

Minotti, G. and Aust, S. D. 1989. The role of iron in oxygen radical mediated lipid peroxidation. Chemico-Biological Interactions 71 (1): 1-19.

Mishra, S. P., Manent, A. S., Chabot, B. and Daneault, C. 2012. Production of nanocellulose from native cellulose—various options utilizing ultrasound. BioResources 7: 422-436.

Neyens, E., Baeyens, J. 2003. A review of classic Fenton's peroxidation as an advanced oxidation technique. Journal of Hazardous Materials B98, 33-50.

Pierre, J. L., Fontecave, M. 1999. Iron and activated oxygen species in biology: The basic chemistry. BioMetals 12: 195-199.

Pierre, J. L., Gautier-Luneau, I. 2000. Iron and citric acid: A fuzzy chemistry of ubiquitous biological relevance. BioMetals 13: 91-96.

Saito, T., Kimura, T., Nishiyama, Y. and Isogai, A. 2007. Cellulose Nanofibers Prepared by TEMPO-Mediated Oxidation of Native Cellulose. Biomacromolecules 8, 2485-2491.

Sixta, H.2006. Handbook of Pulp. H. Sixta Ed. WILEY-VCH Verlag GmbH &Co. KGaA, Weinheim, Germany.

Sixta, H., Süss, H-U., Potthast, A., Schwanninger, M. and Krotscheck, A. W. 2006. Pulp Bleaching in Handbook of Pulp. H. Sixta Ed. WILEY-VCH Verlag GmbH &Co. KGaA, Weinheim, Germany. Volume 2, Chapter 7, p. 609.

Surisetty, V. R., Dalai, A. K. and Kozinski, J. 2010. Intrinsic reaction kinetics of higher alcohol synthesis from synthesis gas over a sulfided alkali-promoted Co—Rh—Mo trimetallic catalyst supported on Multiwalled Carbon Nanotubes (MWCNTs). Energy & Fuels 24 (8), 4130-4137.

Swern, D. 1971. Organic Peroxides in Organic Peroxides, D. Swern, Eds., Wiley-Interscience, New York, Vol. 2, 963 pp.

Wink, D. A., Wink, C. B., Nims, R. W., Ford, P. C. 1994. Oxidizing Intermediates Generated in the Fenton Reagent: Kinetic Arguments Against the Intermediacy of the Hydroxyl Radical. Environ Health Perspect 102 (Suppl 3): 11-15 (1994).

What is claimed is:

1. A method of processing a lignocellulosic biomass to produce crystalline cellulose, comprising the steps of:
    (a) reacting the biomass in an aqueous slurry having a pH less than 7, comprising a transition metal catalyst and hydrogen peroxide, which reaction continues for sufficient length, or is repeated, to produce crystalline cellulose; and (b) separating a solid crystalline cellulose fraction from dissolved lignin and hemicellulose fractions; and (c) separating the crystalline cellulose into a fraction comprising microcrystalline cellulose, and a fraction comprising nanocrystalline cellulose.

2. The method of claim 1 wherein the biomass is pretreated under acidic, basic, oxidizing or reducing conditions.

3. The method of claim 2 comprising the further step of post-treating the cellulose fraction under acidic, basic, oxidizing or reducing conditions.

4. The method of claim 3 wherein the pre-treatment or the post-treatment comprises the step of contacting the biomass or the cellulose fraction with an organic acid.

5. The method of claim 4 wherein the organic acid comprises a peracid, formic acid, or a combination of a peracid and formic acid.

6. The method of claim 1 further comprising the step of post-treating the lignin and/or hemicellulose fractions under acidic, basic, oxidizing or reducing conditions.

7. The method of claim 1 wherein the aqueous slurry is about 2% to about 20% (w/v) biomass.

8. The method of claim 1 wherein the concentration of 35% hydrogen peroxide in the aqueous slurry is about 0.1% to about 1.5% by volume.

9. The method of claim 8 wherein the oxidation-reduction potential of the aqueous slurry is monitored, and the value used to determine and maintain a suitable concentration of hydrogen peroxide.

10. The method of claim 1 wherein the pH of the aqueous slurry is in the range of 3.0 to 4.5.

11. The method of claim 1 wherein the crystalline cellulose is processed to produce colloidal crystalline cellulose, comprising MCC and NCC.

12. The method of claim 11 wherein the crystalline cellulose is processed by application of ultrasound, a homogenizer, a blender, a grinder or a refiner.

13. The method of claim 1 wherein the lignocellulosic biomass comprises wood, wood pulp, a forestry by product or an agricultural byproduct.

14. The method of claim 13 wherein the biomass comprises thermomechanically processed wood pulp, Kraft bleached pulp, Kraft brown pulp, alpha cellulose, flax, hemp straw, or components thereof.

15. The method of claim 1 wherein step (a) is repeated two or more times.

16. The method of claim 1 wherein the aqueous slurry comprises an organic acid.

17. The method of claim 16 wherein the organic acid comprises a polyvalent organic acid.

18. The method of claim 17 wherein the polyvalent organic acid comprises citrate.

19. The method of claim 1 wherein the catalyst comprises nanoparticles comprising multivalent iron.

20. A method of producing crystalline cellulose from cellulose, comprising the steps of:

(a) reacting the cellulose in an aqueous slurry having a pH less than 7, comprising a transition metal catalyst, and hydrogen peroxide in an amount greater than about 0.35% (v/v) in the slurry, wherein the reaction continues for sufficient length or is repeated to produce crystalline cellulose;

(b) recovering a crystalline cellulose fraction.

21. The method of claim 20 wherein the crystalline cellulose fraction comprises microcrystalline and nanocrystalline cellulose fractions and comprising the further step of separating the microcrystalline and nanocrystalline fractions.

22. The method of claim 20 wherein the aqueous slurry comprises a polyvalent organic acid.

23. The method of claim 22 wherein the polyvalent organic acid comprises citric acid.

24. The method of claim 20 wherein the aqueous slurry has a pH in the range of about 3.0 to about 4.5.

* * * * *